US012362519B2

(12) United States Patent
Shioda et al.

(10) Patent No.: US 12,362,519 B2
(45) Date of Patent: Jul. 15, 2025

(54) CONNECTOR

(71) Applicant: IRISO ELECTRONICS CO., LTD., Yokohama (JP)

(72) Inventors: Hideki Shioda, Yokohama (JP); Hiroaki Yukutake, Yokohama (JP); Takaaki Makino, Yokohama (JP); Yoshihito Ohkuma, Yokohama (JP)

(73) Assignee: IRISO ELECTRONICS CO., LTD., Yokohama (JP)

( * ) Notice: Subject to any disclaimer, the term of this patent is extended or adjusted under 35 U.S.C. 154(b) by 385 days.

(21) Appl. No.: 17/797,748

(22) PCT Filed: Feb. 1, 2021

(86) PCT No.: PCT/JP2021/003538
§ 371 (c)(1),
(2) Date: Aug. 5, 2022

(87) PCT Pub. No.: WO2021/157524
PCT Pub. Date: Aug. 12, 2021

(65) Prior Publication Data

US 2023/0065611 A1 Mar. 2, 2023

(30) Foreign Application Priority Data

Feb. 6, 2020 (JP) ................................ 2020-018928

(51) Int. Cl.
*H01R 13/41* (2006.01)
*H01R 13/631* (2006.01)
*H01R 25/00* (2006.01)

(52) U.S. Cl.
CPC ......... *H01R 13/6315* (2013.01); *H01R 13/41* (2013.01); *H01R 25/006* (2013.01)

(58) Field of Classification Search
CPC .. H01R 13/6315; H01R 13/41; H01R 25/006; H01R 12/57; H01R 13/518; H01R 12/716; H01R 12/91; H01R 13/631
See application file for complete search history.

(56) References Cited

U.S. PATENT DOCUMENTS 7,125,260 B2 10/2006 Orita et al.
8,585,421 B2 11/2013 Yamaguchi et al.
(Continued)

FOREIGN PATENT DOCUMENTS

EP 2413435 A1 2/2012
EP 2874243 A1 5/2015
(Continued)

OTHER PUBLICATIONS

Extended European Search Report, for European Patent Application No. 21750918.1, dated Jan. 29, 2024, 11 pages.
(Continued)

*Primary Examiner* — Truc T Nguyen
(74) *Attorney, Agent, or Firm* — Westman, Champlin & Koehler, P.A.

(57) ABSTRACT

When a first movable housing and a second movable housing are provided, relative positions of a first terminal and a second terminal are prevented from deviating from predetermined positions. A connector 1 includes a fixing housing 2, a first movable housing 31, a second movable housing 32, a first terminal 41, and a second terminal 42. The fixing housing 2 includes the first terminal holding portions 21A that hold the first fixing-side held portions 4B of the first terminals 41, and the second terminal holding portions 22A that hold the second fixing-side held portions 4B of the second terminals 42. The first terminal holding portion 21A and the second terminal holding portion 22A of the fixing housing 2 are integrally molded with resin.

7 Claims, 24 Drawing Sheets

(56) References Cited

U.S. PATENT DOCUMENTS

| | | | | |
|---|---|---|---|---|
| 9,088,113 | B2 | 7/2015 | Funayama et al. | |
| 9,160,122 | B2 | 10/2015 | Sato | |
| 9,178,326 | B2 | 11/2015 | Funayama et al. | |
| 9,281,594 | B2 | 3/2016 | Funayama et al. | |
| 9,397,432 | B2 | 7/2016 | Yukutake et al. | |
| 9,799,971 | B2 | 10/2017 | Ninomiya et al. | |
| 10,971,850 | B2 * | 4/2021 | Shioda | H01R 43/24 |
| 10,998,666 | B2 * | 5/2021 | Shioda | H01R 13/20 |
| 2006/0089018 | A1 * | 4/2006 | Orita | H01R 12/58 439/74 |
| 2012/0015546 | A1 | 1/2012 | Yamaguchi et al. | |
| 2014/0342614 | A1 | 11/2014 | Yukutake et al. | |
| 2015/0064935 | A1 | 3/2015 | Funayama et al. | |
| 2015/0064975 | A1 | 3/2015 | Funayama et al. | |
| 2015/0132998 | A1 | 5/2015 | Sato | |
| 2015/0244093 | A1 | 8/2015 | Funayama et al. | |
| 2015/0270658 | A1 | 9/2015 | Aoki et al. | |
| 2017/0264032 | A1 * | 9/2017 | Ninomiya | H01R 12/52 |
| 2017/0338592 | A1 * | 11/2017 | Doi | H01R 13/18 |
| 2018/0048083 | A1 * | 2/2018 | Doi | H01R 12/716 |
| 2019/0020134 | A1 * | 1/2019 | Suzuki | H01R 12/55 |
| 2019/0052005 | A1 * | 2/2019 | Hasegawa | H01R 13/405 |
| 2019/0229455 | A1 * | 7/2019 | Shimoji | H01R 12/91 |
| 2020/0127405 | A1 * | 4/2020 | Shioda | H01R 12/707 |
| 2020/0127410 | A1 * | 4/2020 | Shioda | H01R 43/24 |
| 2023/0006384 | A1 | 1/2023 | Morita | |

FOREIGN PATENT DOCUMENTS

| | | | |
|---|---|---|---|
| EP | 4068525 | A1 | 10/2022 |
| JP | 2004281176 | A | 10/2004 |
| JP | 2006120448 | A | 5/2006 |
| JP | 2007220415 | A | 8/2007 |
| JP | 2014067723 | A | 4/2014 |
| JP | 5606588 | B1 | 10/2014 |
| JP | 2015176861 | A | 10/2015 |
| JP | 2016184487 | A | 10/2016 |
| JP | 2017162624 | A | 9/2017 |
| JP | 2017220431 | A | 12/2017 |
| JP | 2018063886 | A | 4/2018 |
| JP | 2019169347 | A | 10/2019 |
| JP | 2021086727 | A | 6/2021 |

OTHER PUBLICATIONS

Japanese Office Action for corresponding Japanese Application No. 2020-018928, dated Nov. 26, 2024, filed Feb. 6, 2020, 5 pages.

Translation of Japanese Office Action for Japanese Patent Application No. 2024-062048, dated Jan. 15, 2025, 6 pages.

International Search Report (including English translation) and Written Opinion for International Application No. PCT/JP2021/003538, dated Feb. 25, 2021, 10 pages.

Translation of Japanese Office Action for Japanese Patent Application No. 2024-062048, dated Apr. 18, 2025, 6 pages.

* cited by examiner

CONNECTOR

CROSS-REFERENCE TO RELATED APPLICATION

This Application is a Section 371 National Stage Application of International Application No. PCT/JP2021/003538, filed on Feb. 1, 2021, entitled "CONNECTOR", which published as WO 2021/157524 A1, on Aug. 12, 2021, in Japanese, and claims priority to Japanese Patent Application No. 2020-018928, filed on Feb. 6, 2020, the contents of which are hereby incorporated by reference in their entireties.

DESCRIPTION

Technical Field

The present disclosure relates to a connector.

Background Art

Patent Literature 1 discloses a connector including a fixing housing attached to a substrate, and a movable housing which is movable with respect to the fixing housing. The movable housing is configured such that a connection object can be fitted thereto.

PRIOR ART DOCUMENT

Patent Literature

Patent Literature 1: JP 2014-067723 A

SUMMARY OF INVENTION

Technical Problem

In order to transmit many signals, a plurality of connectors as described above may be prepared and arranged close to each other on a substrate.

A first object of the disclosure is to prevent relative positions of a terminal (first terminal) held by a first movable housing and a terminal (second terminal) held by a second movable housing from deviating from predetermined positions in a case where the first movable housing and the second movable housing are provided.

A second object of the disclosure is to prevent breakage of a restraint space forming portion in a connector in which the restraint space forming portion having a pair of side walls and a top wall is formed in a fixing housing.

A third object of the disclosure is to downsize a connector in an arrangement direction (direction in which a first movable housing and a second movable housing are arranged) in the connector including the first movable housing and the second movable housing.

Solution to Problem

First Aspect

A connector according to a first aspect-1 includes: a fixing housing whose position with respect to an attachment object is fixed; a first movable housing which is movable with respect to the fixing housing, the first movable housing including a first fitting portion which is fittable with a first connection object; a second movable housing which is movable with respect to the fixing housing, the second movable housing including a second fitting portion which is fittable with a second connection object; a first terminal including a first fixing-side held portion held by the fixing housing, a first movable-side held portion held by the first movable housing, and a first intermediate portion located between the first fixing-side held portion and the first movable-side held portion; and a second terminal including a second fixing-side held portion held by the fixing housing, a second movable-side held portion held by the second movable housing, and a second intermediate portion located between the second fixing-side held portion and the second movable-side held portion, in which the fixing housing includes: a first terminal holding portion that holds the first fixing-side held portion of the first terminal; and a second terminal holding portion that holds the second fixing-side held portion of the second terminal, and in which at least the first terminal holding portion and the second terminal holding portion of the fixing housing are integrally molded with resin.

In the above aspect, the connector includes: the fixing housing whose position with respect to the attachment object (for example, a substrate) is fixed; the first movable housing which is movable with respect to the fixing housing, the first movable housing including the first fitting portion which is fittable with the first connection object; and the second movable housing which is movable with respect to the fixing housing, the second movable housing including the second fitting portion which is fittable with the second connection object.

The connector includes the first terminal and the second terminal. The first terminal includes the first fixing-side held portion held by the fixing housing, the first movable-side held portion held by the first movable housing, and the first intermediate portion located between the first fixing-side held portion and the first movable-side held portion. The second terminal includes the second fixing-side held portion held by the fixing housing, the second movable-side held portion held by the second movable housing, and the second intermediate portion located between the second fixing-side held portion and the second movable-side held portion.

The fixing housing includes: the first terminal holding portion that holds the first fixing-side held portion of the first terminal; and the second terminal holding portion that holds the second fixing-side held portion of the second terminal.

Here, if the portion of the fixing housing that holds the first terminal (first terminal holding portion) and the portion of the fixing housing that holds the second terminal (second terminal holding portion) are separate bodies, there is a possibility that the relative positions of the first fixing-side held portion of the first terminal and the second fixing-side held portion of the second terminal may deviate from predetermined positions.

On the other hand, in the above aspect, the portion of the fixing housing that holds the first terminal (first terminal holding portion) and the portion of the fixing housing that holds the second terminal (second terminal holding portion) are integrally molded with resin, so that the relative positions of the first fixing-side held portion of the first terminal and the second fixing-side held portion of the second terminal are prevented from deviating from the predetermined positions.

In a connector according to a first aspect-2, in the first aspect-1, the fixing housing includes an intermediate portion connecting the first terminal holding portion and the second terminal holding portion, and a gate mark is formed at the intermediate portion.

In the above aspect, the gate mark (which means a mark formed at a position corresponding to a gate through which a molten resin flows into a molding die) is formed at the intermediate portion connecting the first terminal holding portion and the second terminal holding portion.

Therefore, when the fixing housing is molded, the molten resin can flow in from a portion located between the first terminal holding portion and the second terminal holding portion. Therefore, the molten resin can efficiently flow in the molding die, and it is possible to prevent a decrease in the strength of the fixing housing and distortion of the shape of the fixing housing.

It is preferable that a press-fitting portion into which a fixing metal fitting is press-fitted is not formed at the intermediate portion of the fixing housing from the viewpoint of making the flow of the molten resin from the intermediate portion smooth.

In a connector according to a first aspect-3, in the first aspect-1 or the first aspect-2, the fixing housing includes: an accommodation space that penetrates the fixing housing in an up-down direction and accommodates the first movable housing and the second movable housing; and an intermediate connection portion that divides the accommodation space into a first accommodation space in which the first movable housing is accommodated and a second accommodation space in which the second movable housing is accommodated.

In the above aspect, the fixing housing has the accommodation space that penetrates the fixing housing in the up-down direction and accommodates the first movable housing and the second movable housing. The accommodation space is divided into the first accommodation space in which the first movable housing is accommodated and the second accommodation space in which the second movable housing is accommodated by the intermediate connection portion of the fixing housing.

Therefore, it is possible to prevent the resin constituting the fixing housing from contracting at the time of molding the fixing housing and the fixing housing from being deformed due to the contraction.

In a connector according to a first aspect-4, in the first aspect-3, the intermediate connection portion restricts an upward movement of the first movable housing by abutting on the first movable housing, and restricts an upward movement of the second movable housing by abutting on the second movable housing.

In the above aspect, the intermediate connection portion restricts the upward movement of the first movable housing and restricts the upward movement of the second movable housing by abutting on the second movable housing.

Therefore, the intermediate connection portion can be caused to function effectively.

In a connector according to a first aspect-5, in any one of the first aspect-1 to the first aspect-4, the fixing housing includes a first upper restriction portion and a second upper restriction portion, the first movable housing includes a first upper abutment portion that restricts upward movement of the first movable housing by abutting on the first upper restriction portion, the second movable housing includes a second upper abutment portion that restricts upward movement of the second movable housing by abutting on the second upper restriction portion, the first movable housing and the second movable housing are arranged in a predetermined arrangement direction, and the first upper abutment portion and the second upper abutment portion both protrude in the arrangement direction.

In the above aspect, the first upper abutment portion of the first movable housing restricts the upward movement of the first movable housing by abutting on the first upper restriction portion of the fixing housing, and the second upper abutment portion of the second movable housing restricts the upward movement of the second movable housing by abutting on the second upper restriction portion of the fixing housing.

Here, the first upper abutment portion and the second upper abutment portion protrude in the arrangement direction that is the direction in which the first movable housing and the second movable housing are arranged.

Therefore, it is easy to downsize the connector in a direction perpendicular to the arrangement direction among the directions perpendicular to the up-down direction.

In a connector according to a first aspect-6, in the connector according to any one of the first aspect-1 to the first aspect-5, the fixing housing includes: an accommodation space that penetrates the fixing housing in an up-down direction and accommodates the first movable housing and the second movable housing; and an intermediate connection portion that divides the accommodation space into a first accommodation space in which the first movable housing is accommodated and a second accommodation space in which the second movable housing is accommodated, the fixing housing includes a first upper restriction portion and a second upper restriction portion, the first movable housing includes a first upper abutment portion that restricts upward movement of the first movable housing by abutting on the first upper restriction portion, the second movable housing includes a second upper abutment portion that restricts upward movement of the second movable housing by abutting on the second upper restriction portion, the first movable housing and the second movable housing are arranged in a predetermined arrangement direction, the first upper abutment portion and the second upper abutment portion both protrude in the arrangement direction, and the intermediate connection portion functions as the first upper restriction portion and also functions as the second upper restriction portion.

Second Aspect

A connector according to a second aspect-1 includes: a fixing housing whose position with respect to an attachment object is fixed; and a movable housing which is movable with respect to the fixing housing, in which the movable housing has a protruding portion protruding in a protruding direction that is a direction perpendicular to an up-down direction, in which the fixing housing has a restraint space forming portion that forms a restraint space that is a space in which the protruding portion is restrained, in which the restraint space forming portion has a pair of side walls located on sides of the protruding portion, and a top wall located above the protruding portion, in which the top wall restricts an upward movement of the movable housing when the protruding portion abuts on the top wall, and in which the restraint space forming portion has a reinforcing wall located on the protruding direction side with respect to the protruding portion and connecting the pair of side walls.

In the above aspect, the connector includes: the fixing housing whose position with respect to the attachment object is fixed; and the movable housing which is movable with respect to the fixing housing. The movable housing has the protruding portion protruding in the protruding direction that is a direction perpendicular to the up-down direction. The fixing housing has the restraint space forming portion that forms the restraint space that is a space in which the protruding portion is restrained. The restraint space forming portion has the pair of side walls located on the sides of the protruding portion, and the top wall located above the protruding portion. The top wall restricts the upward movement of the movable housing when the protruding portion abuts on the top wall.

Here, the restraint space forming portion includes the reinforcing wall located on the protruding direction side with respect to the protruding portion and connecting the pair of side walls.

Therefore, the vicinity of the top wall in the restraint space forming portion is reinforced by the reinforcing wall, and breakage of the restraint space forming portion is prevented.

In the embodiment described later, the lower surface of the reinforcing wall is flush with the lower surfaces of the pair of side walls, but the reinforcing wall of the above aspect is not limited thereto. From the viewpoint of strength, it is preferable that the lower surface of the reinforcing wall is flush with the lower surfaces of the pair of side walls, but the lower surface of the reinforcing wall may be formed above the lower surfaces of the pair of side walls.

In the embodiment described later, the upper end of the reinforcing wall and the top wall are connected to each other, but the above aspect is not limited thereto. For example, the reinforcing wall and the top wall are not necessarily connected to each other, and an opening may be formed between the reinforcing wall and the top wall.

In the embodiment described later, the reinforcing wall is made of resin, and is molded integrally with the pair of side walls and the top wall, but the above aspect is not limited thereto. For example, the reinforcing wall may be made of metal. By disposing the metal reinforcing wall on the protruding direction side with respect to the protruding portion, the vicinity of the top wall in the restraint space forming portion can be reinforced without enlarging the vertical dimension of the restraint space forming portion.

In the embodiment described later, the protruding portion of the movable housing can abut on the pair of side walls of the restraint space forming portion, but the above aspect is not limited thereto.

In a connector according to a second aspect-2, in the second aspect-1, even when the movable housing moves in parallel to the limit in the protruding direction, the protruding portion does not abut on the reinforcing wall.

In the above aspect, even when the movable housing moves in parallel to the limit in the protruding direction, the protruding portion does not abut on the reinforcing wall. Therefore, the strength required for the reinforcing wall itself is low. Therefore, the reinforcing wall can be thinned, and the fixing housing can be downsized.

In a connector according to a second aspect-3, in the second aspect-1 or the second aspect-2, the protruding portion has a protruding end surface facing the protruding direction side, and a gate mark is formed on the protruding end surface.

In the above aspect, the gate mark is formed on the protruding end surface of the protruding portion. In such a movable housing, when the size of the gate for injecting the molten resin is secured, there is a limit to downsizing of the protruding portion. As a result, the restraint space in which the protruding portion is restrained also needs to have a certain size. In order to reduce the height of the restraint space forming portion of the fixing housing while accommodating the protruding portion having a limit of downsizing, it is conceivable to thin the top wall. However, when the top wall is thinned, the restraint space forming portion may be damaged near the thinned top wall when the movable housing strongly abuts against the fixing housing. Therefore, by providing the reinforcing wall, breakage of the restraint space forming portion is prevented.

Therefore, the above aspect is effective when the restraint space forming portion is formed low in the connector in which the gate mark is formed on the protruding end surface of the protruding portion.

Third Aspect

A connector according to a third aspect-1 includes: a fixing housing whose position with respect to an attachment object is fixed; a first movable housing which is movable with respect to the fixing housing, the first movable housing including a first fitting portion which is fittable with a first connection object; a second movable housing which is movable with respect to the fixing housing, the second movable housing including a second fitting portion which is fittable with a second connection object; a first terminal including a first fixing-side held portion held by the fixing housing, a first movable-side held portion held by the first movable housing, and a first intermediate portion located between the first fixing-side held portion and the first movable-side held portion; and a second terminal including a second fixing-side held portion held by the fixing housing, a second movable-side held portion held by the second movable housing, and a second intermediate portion located between the second fixing-side held portion and the second movable-side held portion, in which the first movable housing and the second movable housing are arranged in a predetermined arrangement direction (for example, front-rear direction) that is a direction perpendicular to an up-down direction, in which the first movable housing has a first side protruding portion protruding in a direction (for example, rear direction) that is a direction perpendicular to the up-down direction and toward the second movable housing, in which the second movable housing has a second side protruding portion protruding in a direction (for example, front direction) that is a direction perpendicular to the up-down direction and toward the first movable housing, in which the fixing housing has a restraint space forming portion that forms a restraint space that is a space in which both the first side protruding portion and the second side protruding portion are restrained, in which the restraint space forming portion has a top wall located above the first side protruding portion and the second side protruding portion, in which the top wall restricts upward movements of the first movable housing and the second movable housing when the first side protruding portion and the second side protruding portion abut on the top wall, and in which the restraint space has a shared restraint space in which both the first side protruding portion and the second side protruding portion can be positioned.

In the above aspect, the connector includes the fixing housing, the first movable housing having the first fitting portion that can be fitted to the first connection object, the second movable housing having the second fitting portion that can be fitted to the second connection object, the first terminal, and the second terminal.

The first movable housing and the second movable housing are arranged in a predetermined arrangement direction (for example, front-rear direction) that is a direction perpendicular to the up-down direction. The first movable housing has the first side protruding portion protruding in the direction (for example, rear direction) that is the direction perpendicular to the up-down direction and toward the second movable housing, and the second movable housing has the second side protruding portion protruding in the direction (for example, front direction) that is the direction perpendicular to the up-down direction and toward the first movable housing.

In addition, the fixing housing has the restraint space forming portion that forms the restraint space that is the space in which both the first side protruding portion and the second side protruding portion restrained. The restraint space forming portion has the top wall located above the first side protruding portion and the second side protruding portion, and the top wall restricts the upward movement of the first movable housing and the second movable housing when the first side protruding portion and the second side protruding portion abut on the top wall.

Here, the restraint space has the shared restraint space in which both the first side protruding portion and the second side protruding portion can be positioned.

Therefore, for example, when the first movable housing moves in a direction away from the second movable housing, the second protruding portion of the second movable housing can move to the space where the first side protruding portion was located before the movement. For example, when the second movable housing moves in a direction away from the first movable housing, the first side protruding portion of the first movable housing can move to the space where the second side protruding portion was located before the movement. That is, at least a part of the restraint space is shared by the first side protruding portion and the second side protruding portion.

Therefore, the connector can be easily downsized in the arrangement direction.

The first connection object and the second connection object may be configured not to be relatively displaced from each other. For example, a mating connector as the connection object of the connector according to the above aspect may include the first connection object and the second connection object, and the mating connector may be configured such that the first connection object and the second connection object are not relatively displaced from each other. In this case, when the mating connector moves with respect to the connector, the first movable housing and the second movable housing move integrally.

In the embodiment described later, the entire fixing housing is integrally molded with resin, and as a result, a portion of the fixing housing that holds the first terminal (first terminal holding portion) and a portion of the fixing housing that holds the second terminal (second terminal holding portion) are integrally molded with resin. However, the above aspect is not limited thereto. For example, the first terminal holding portion and the second terminal holding portion may be molded as separate bodies, and a portion of an intermediate portion of a fixing housing in the embodiment described later may be formed of a metal member. In this case, a part of the metal member functions as a top wall.

In a connector according to a third aspect-2, in the third aspect-1, an interval between the first side protruding portion and the second side protruding portion in the arrangement direction (for example, front-rear direction) in a normal state is ⅕ or less of a distance by which the first movable housing can move in a direction (for example, rear direction) of approaching the second movable housing from the normal state, and is ⅕ or less of a distance by which the second movable housing can move in a direction (for example, front direction) of approaching the first movable housing from the normal state.

In the above aspect, in the normal state, the first side protruding portion and the second side protruding portion are close to each other in the arrangement direction (for example, front-rear direction). Specifically, the interval between the first side protruding portion and the second side protruding portion in the arrangement direction (for example, front-rear direction) in the normal state is ⅕ or less of the distance by which the first movable housing can move in the direction (for example, rear direction) of approaching the second movable housing from the normal state, and ⅕ or less of the distance by which the second movable housing can move in the direction (for example, front direction) of approaching the first movable housing from the normal state.

Therefore, the connector 1 can be more easily downsized in the arrangement direction.

DESCRIPTION OF EMBODIMENTS

In the following description, arrows X, Y, and Z illustrated in the respective drawings are directional concepts with reference to a connector and components thereof. The +X direction is referred to as a front direction of the connector, the +Y direction is referred to as one side in a width direction of the connector, and the +Z direction is referred to as an upper direction of the connector. When simply referring to the front-rear direction, the width direction, and the up-down direction, those means a front-rear direction of the connector, the width direction of the connector, and an up-down direction of the connector.

<Outline>

A connector 1 is configured to be connectable to a mating connector with the up-down direction as a connection direction. The connector 1 and the mating connector (not illustrated) constitute a connector pair. The connector 1 is mounted on a substrate (not illustrated), and the mating connector is mounted on a mating substrate (not illustrated). In a state where the connector 1 and the mating connector are connected, the substrate and the mating substrate are arranged in parallel to each other with the connector pair interposed therebetween.

Figure 1:
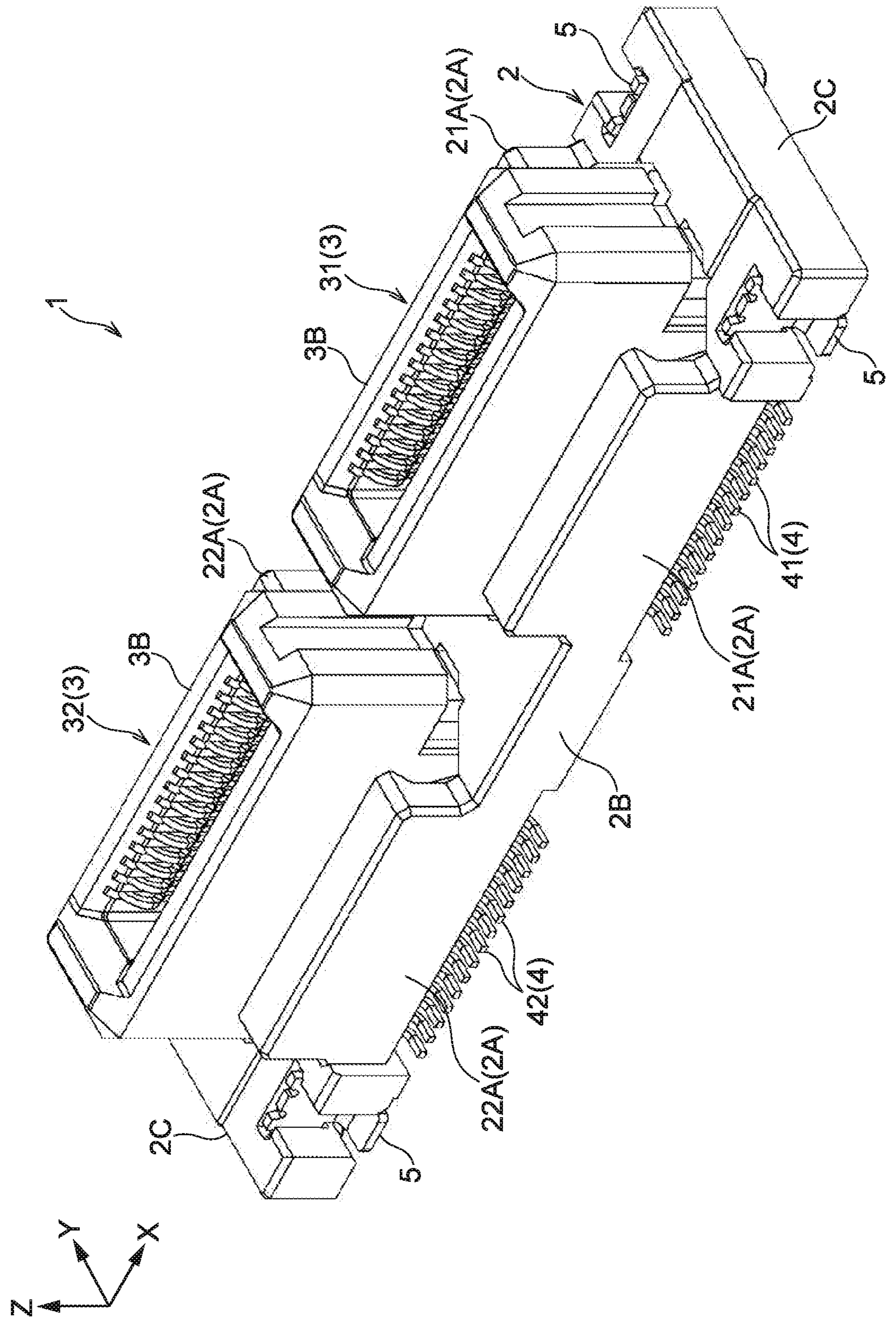
FIG. 1 is a perspective view of a connector.
Figure 2:
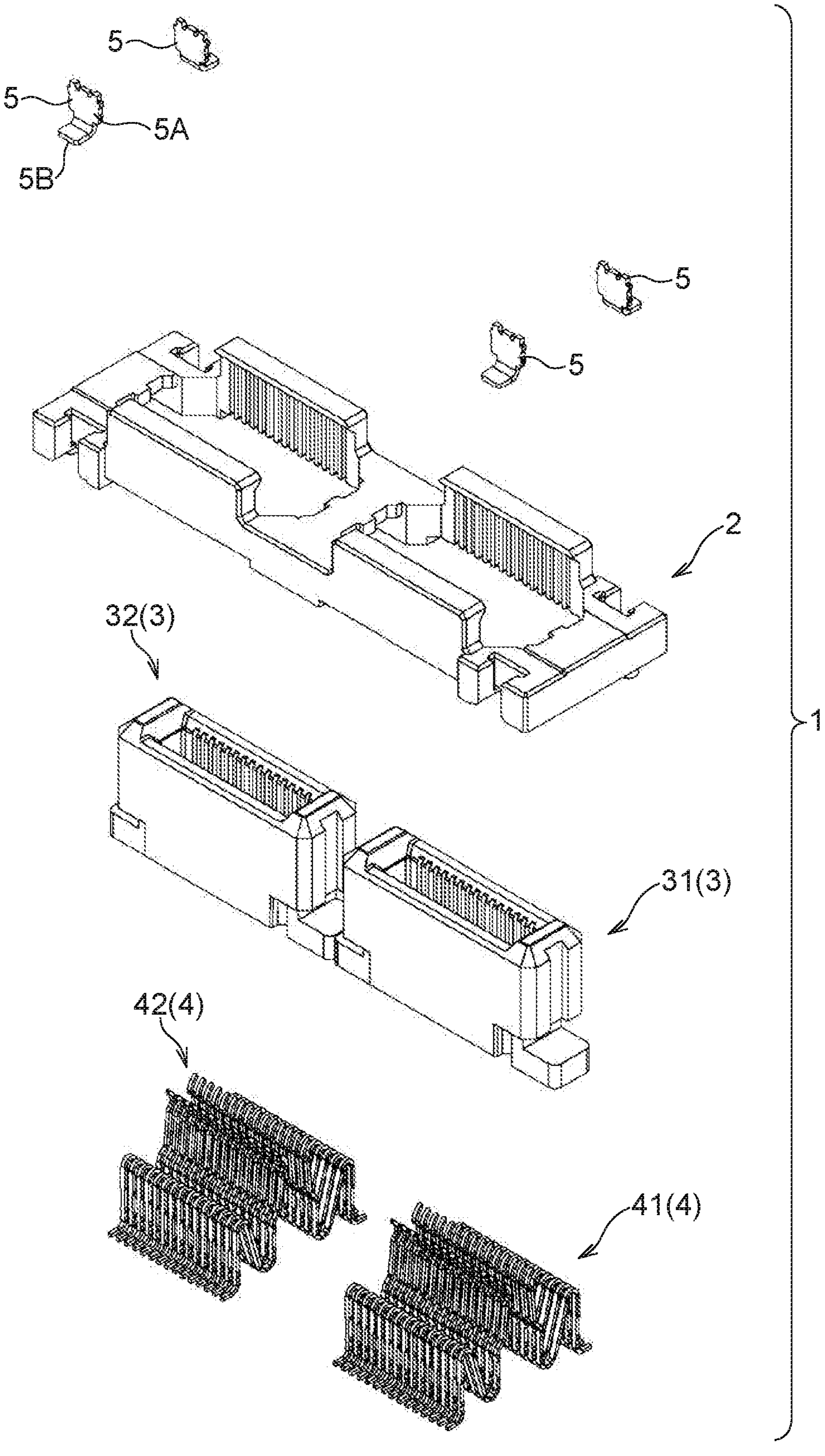
FIG. 2 is an exploded perspective view of the connector.

FIG. 1 is a perspective view of the connector 1, and FIG. 2 is an exploded perspective view of the connector 1.

The connector 1 includes a fixing housing 2, two movable housings 3, a plurality of terminals 4, and a plurality of (four in the present embodiment) fixing metal fittings 5.

The fixing housing 2 and the movable housing 3 are formed of an insulator such as synthetic resin. The fixing housing 2 holds a part (fixing-side held portion 4B, see FIG. 8) of the terminal 4. The fixing housing 2 is fixed to the substrate via the terminals 4 and is not movable with respect to the substrate. The movable housing 3 holds another part (movable-side held portion 4D) of the terminal 4. The movable housing 3 is movable with respect to the substrate and the fixing housing 2. Each of the plurality of terminals 4 includes an intermediate elastic portion 4C between the fixing-side held portion 4B and the movable-side held portion 4D. Elastic deformation of the intermediate elastic portion 4C allows movement of the movable housing 3 with respect to the fixing housing 2.

Each of the plurality of fixing metal fittings 5 includes a press-fitting portion 5A press-fitted into the fixing housing 2 and a substrate fixing portion 5B fixed to the substrate. The fixing metal fitting 5 is press-fitted into the fixing housing 2 from above. The fixing metal fitting 5 reinforces the fixing of the fixing housing 2 to the substrate.

<Detailed Structure of Connector 1>

A detailed structure of the connector 1 will be described.

<<Terminal 4>>

The terminal 4 will be described with reference to FIG. 8 and the like.

The terminal 4 is manufactured by performing punching, bending, and the like on a plate material.

The plurality of terminals 4 include a plurality of terminals 4 arranged in the front-rear direction (pitch direction) on one side in the width direction (inter-row direction) and a plurality of terminals 4 arranged in the front-rear direction (pitch direction) on the other side in the width direction (inter-row direction). The terminal 4 on one side in the width direction and the terminal 4 on the other side in the width direction are arranged such that contact portions 4F thereof face each other.

As illustrated in FIG. 2, the plurality of terminals 4 include a plurality of first terminals 41 held by a first movable housing 31 and a plurality of second terminals 42 held by a second movable housing 32. The first terminal 41 and the second terminal 42 have the same shape.

(Configuration of Each Terminal)

Figure 8:
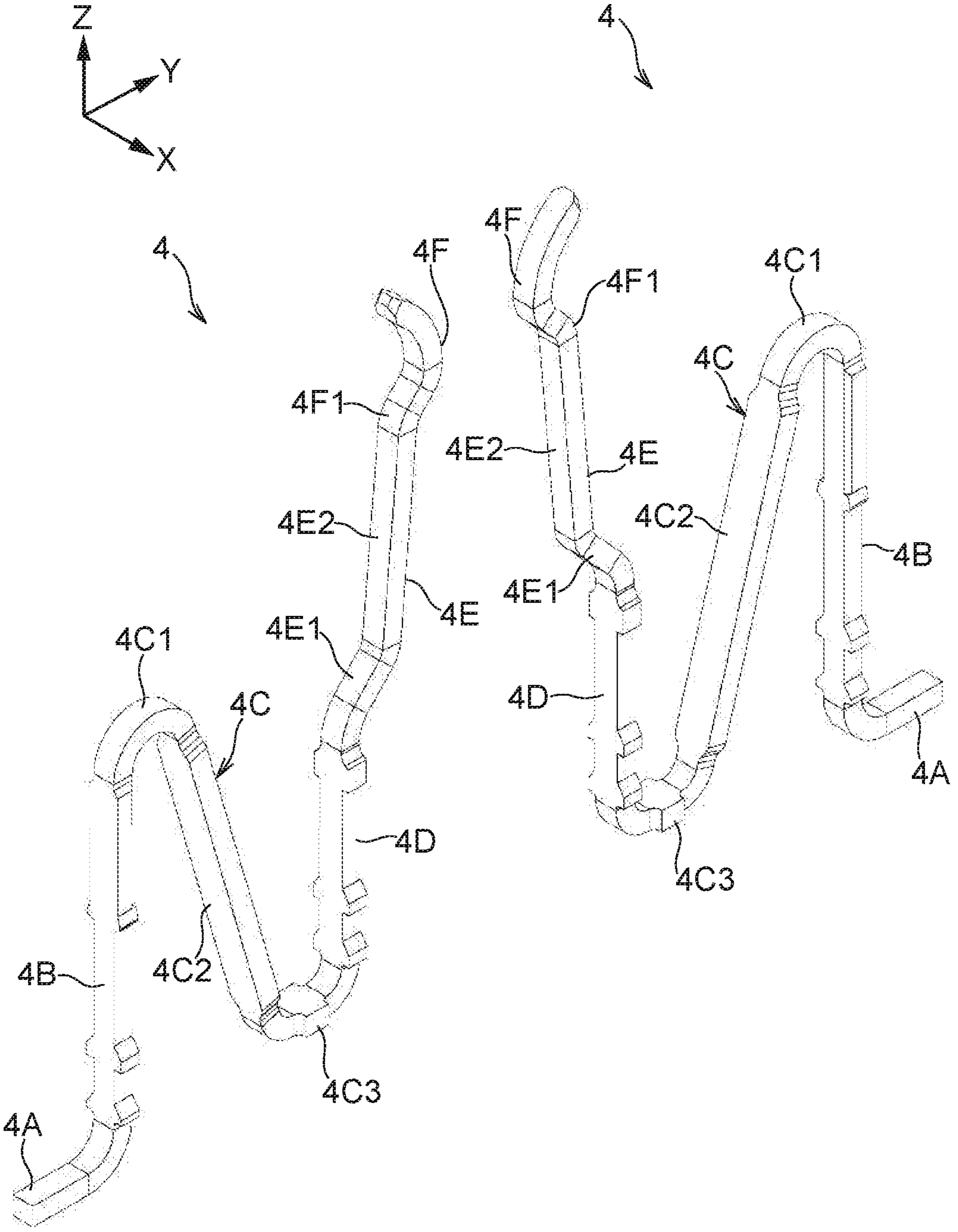
FIG. 8 is an enlarged perspective view of terminals.

As illustrated in FIG. 8, the terminal 4 integrally includes a substrate fixing portion 4A, the fixing-side held portion 4B, the intermediate elastic portion 4C, the movable-side held portion 4D, a distal end elastic portion 4E, and the contact portion 4F from one end toward the other end.

The substrate fixing portion 4A is fixed to the substrate. The substrate fixing portion 4A extends inward in the width direction from one end side toward the other end side.

The fixing-side held portion 4B is held by the fixing housing 2. The fixing-side held portion 4B extends upward and has press-fit protrusions on both sides in the front-rear direction which is the plate width direction. The fixing-side held portion 4B is press-fitted into the fixing housing 2 from below.

The intermediate elastic portion 4C is configured to be elastically deformable such that the movable-side held portion 4D is displaceable with respect to the fixing-side held portion 4B. The intermediate elastic portion 4C includes a first curved portion 4C1, a straight portion 4C2, and a second curved portion 4C3.

The first curved portion 4C1 is formed by bending a portion on the other end side of the fixing-side held portion 4B in the plate thickness direction. The straight portion 4C2 extends linearly in a direction inclined inward in the width direction toward the lower direction. The second curved portion 4C3 is formed by bending a portion on the other end side of the straight portion 4C2 in the plate thickness direction. The second curved portion 4C3 connects the straight portion 4C2 and the movable-side held portion 4D.

The movable-side held portion 4D is held by the movable housing 3. The movable-side held portion 4D extends upward and has press-fit protrusions on both sides in the front-rear direction which is the plate width direction. The movable-side held portion 4D is press-fitted into the movable housing 3 from below.

The distal end elastic portion 4E elastically supports the contact portion 4F so that the contact portion 4F can be displaced with respect to the movable housing 3. The distal end elastic portion 4E includes a first extending portion 4E1 on one end side and a second extending portion 4E2 on the other end side. Both the first extending portion 4E1 and the second extending portion 4E2 extend in a direction inclined inward in the width direction toward the upper direction, and the first extending portion 4E1 has a larger inclination angle with respect to the upper direction than the second extending portion 4E2.

The contact portion 4F comes into contact with a mating terminal of the mating connector as a "connection object". The contact portion 4F is curved so as to protrude inward in the width direction. A curved portion 4F1 is formed between the contact portion 4F and the distal end elastic portion 4E such that the contact portion 4F protrudes inward in the width direction.

<<Fixing Housing 2>>

The fixing housing 2 will be described with reference to FIGS. 9 to 12 and the like.

(Terminal Holding Portion 2A)

The fixing housing 2 includes terminal holding portions 2A.

The terminal holding portion 2A holds a part of the terminal 4 (fixing-side held portion 4B).

The terminal holding portion 2A includes a side wall 2A1. A plurality of press-fit grooves extending in the up-down direction are formed in a width direction inner surface of the side wall 2A1. The fixing-side held portions 4B of the plurality of terminals 4 are press-fitted into the plurality of press-fitting grooves from below.

A plurality of terminal holding portions 2A are formed in the fixing housing 2.

The plurality of terminal holding portions 2A include a pair of first terminal holding portions 21A and a pair of second terminal holding portions 22A. The first terminal holding portion 21A holds the plurality of first terminals 41, and the second terminal holding portion 22A holds the plurality of second terminals 42.

A first arrangement space 21S in which the first movable housing 31 is arranged is formed between the pair of first terminal holding portions 21A, and a second arrangement space 22S in which the second movable housing 32 is arranged is formed between the pair of second terminal holding portions 22A.

The terminal holding portion 2A includes an upper wall 2A2 extending inward in the width direction from the upper end of the side wall 2A1.

Figure 7:
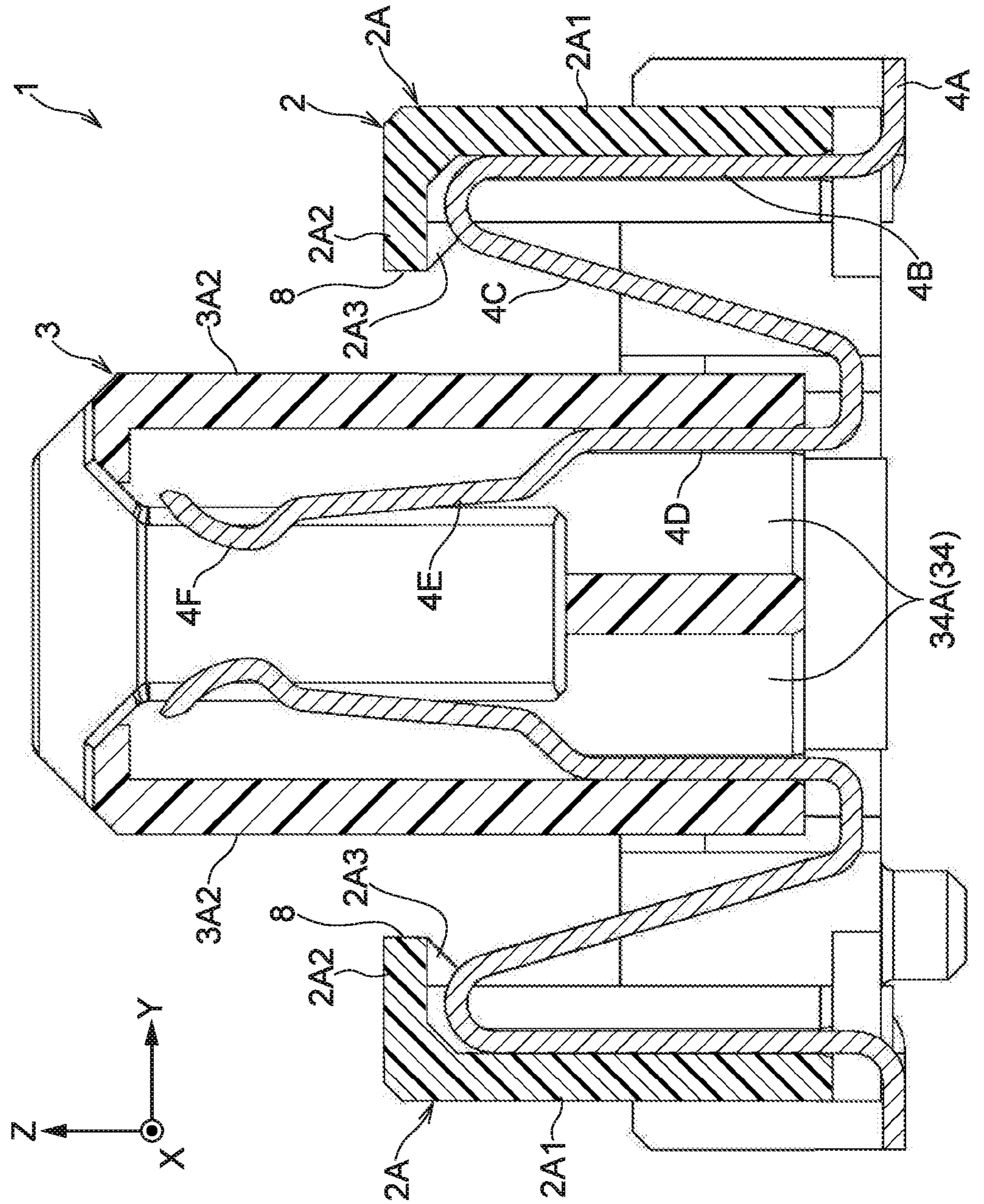
FIG. 7 is a cross-sectional view of the connector.

As illustrated in FIG. 7, the side wall 2A1 protects the intermediate elastic portions 4C of the terminals 4 from the outside in the width direction, and the upper wall 2A2 protects the intermediate elastic portions 4C of the terminals 4 from the upper side. The side wall 2A1 and the upper wall 2A2 each function as a "protective wall" for protecting the intermediate elastic portions 4C of the terminals 4.

Figure 10:
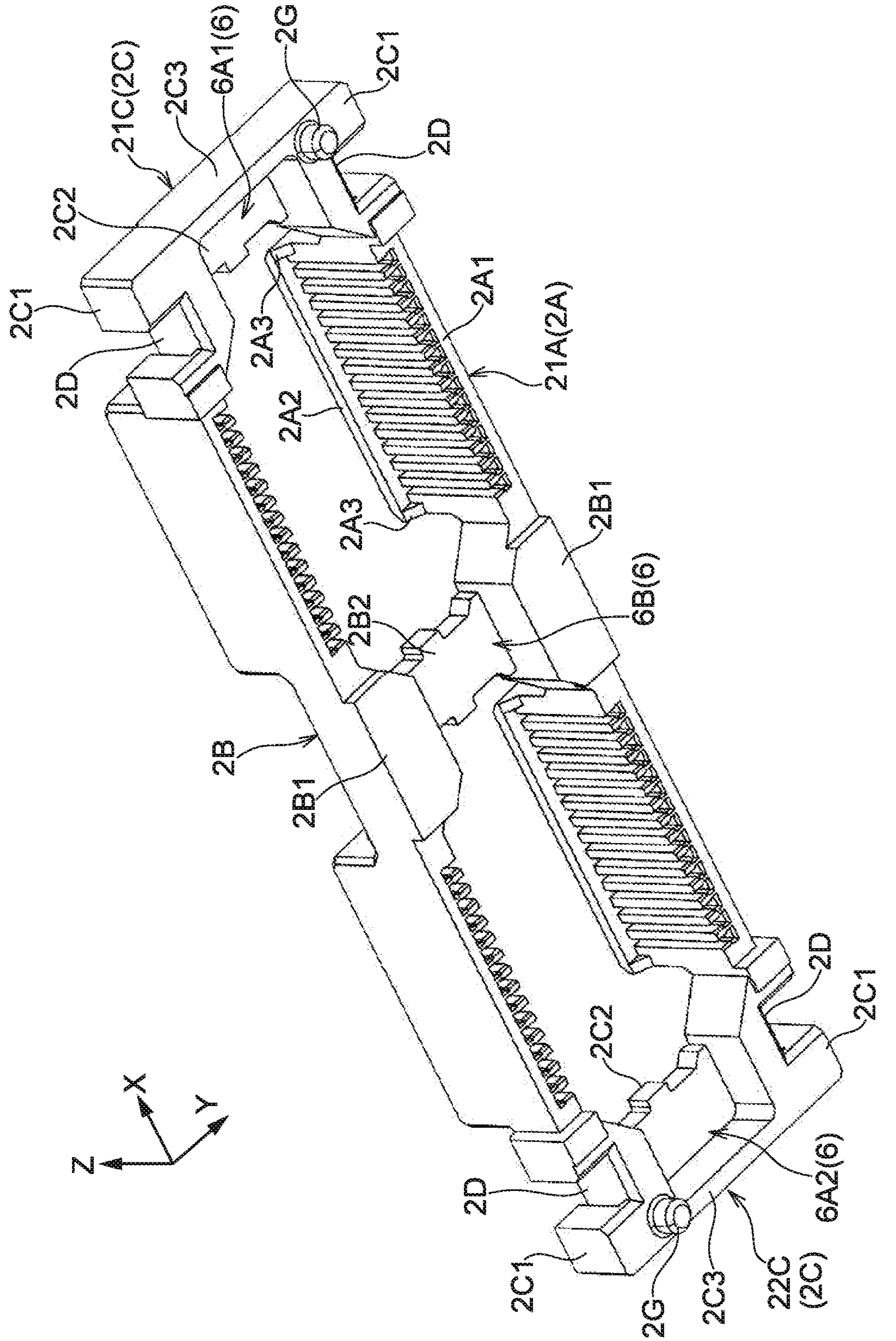
FIG. 10 is a perspective view of the fixing housing as viewed from below.

The terminal holding portion 2A includes reinforcing portions 2A3 that reinforce the upper wall 2A2 (FIG. 10).

The reinforcing portions 2A3 connect the upper wall 2A2 and the side wall 2A1 at both end portions in the extending direction of the terminal holding portion 2A. The reinforcing portion 2A3 is formed on the inner side of the upper end portion of the side wall 2A1 in the width direction and on the lower side of the upper wall 2A2.

(Intermediate Portion 2B)

The fixing housing 2 includes an intermediate portion 2B formed between the first terminal holding portions 21A and the second terminal holding portions 22A.

The intermediate portion 2B includes a side wall 2B1 on one side formed between the first terminal holding portion 21A on one side and the second terminal holding portion 22A on one side, a side wall 2B1 on the other side formed between the first terminal holding portion 21A on the other side and the second terminal holding portion 22A on the other side, and a top wall 2B2 ("intermediate connection portion") connecting the side walls 2B1 on one side and the other side.

(Front End Portion 21C)

The fixing housing 2 includes a front end portion 21C.

The front end portion 21C is formed on the front side of the pair of first terminal holding portions 21A, and connects the front end of the first terminal holding portion 21A on one side and the front end of the first terminal holding portion 21A on the other side.

(Rear End Portion 22C)

The fixing housing 2 includes a rear end portion 22C.

The rear end portion 22C is formed on the rear side of the pair of second terminal holding portions 22A, and connects the rear end of the second terminal holding portion 22A on one side and the rear end of the second terminal holding portion 22A on the other side.

The front end portion 21C and the rear end portion 22C have substantially the same configuration. Hereinafter, the front end portion 21C and the rear end portion 22C will be referred to as front-rear end portions 2C when not particularly distinguished from each other.

As illustrated in FIG. 10, the fixing housing 2 is formed with restraint spaces 6 in which a part (protruding portion 36) of the movable housing 3 is restrained.

A plurality of restraint spaces 6 are formed in the fixing housing 2. The plurality of restraint spaces 6 include a front restraint space 6A 1, an intermediate restraint space 6B, and a rear restraint space 6A2.

Figure 6:
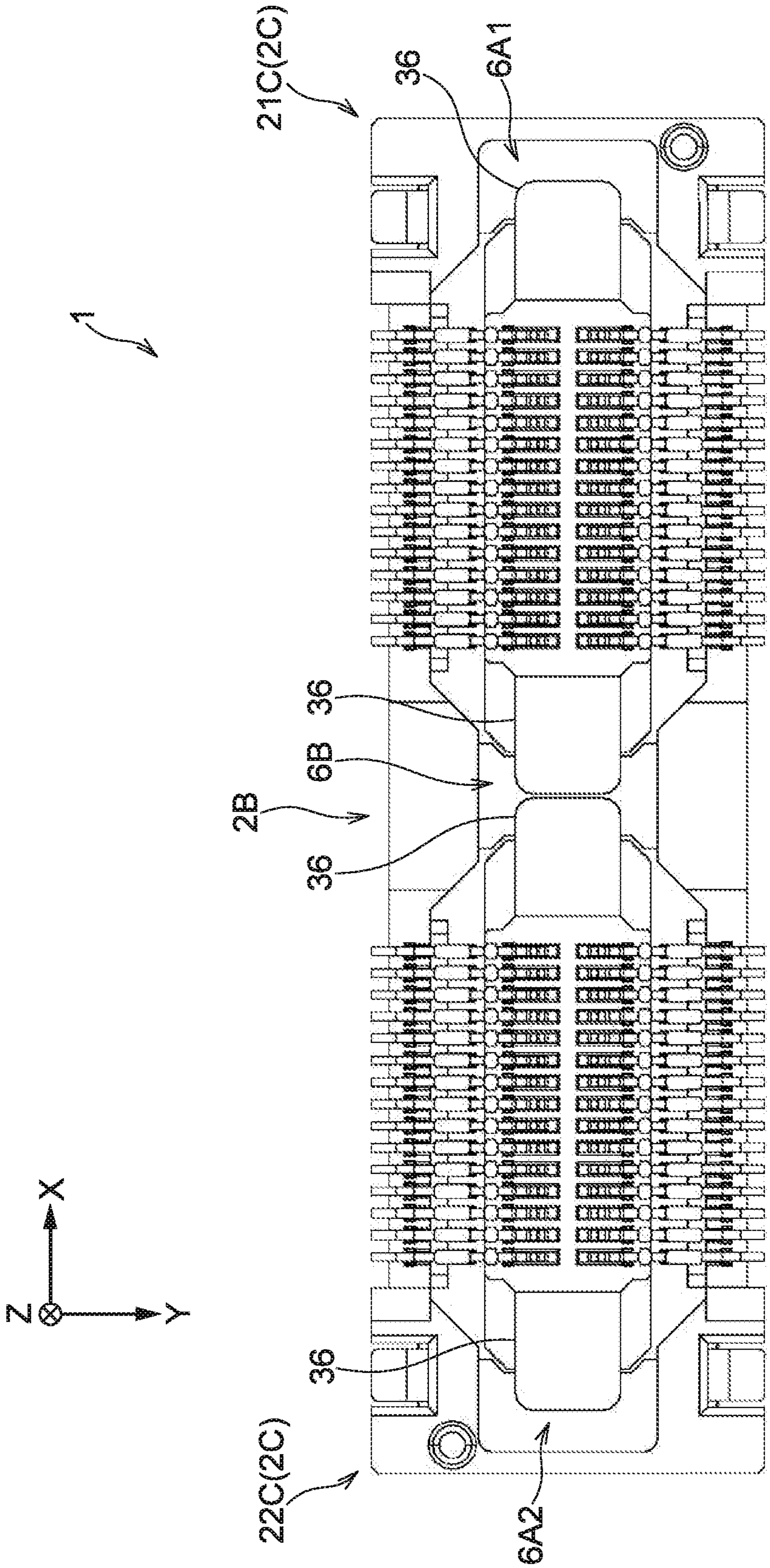
FIG. 6 is a bottom view of the connector.

As illustrated in FIG. 6, the protruding portion 36 on the front side of the first movable housing 31 is restrained in the front restraint space 6A1.

The protruding portion 36 on the rear side of the second movable housing 32 is restrained in the rear restraint space 6A2.

The protruding portion 36 on the rear side of the first movable housing 31 and the protruding portion 36 on the front side of the second movable housing 32 are restricted in the intermediate restraint space 6B.

The front restraint space 6A1 is formed at the front end portion 21C of the fixing housing 2. The rear restraint space 6A2 is formed at the rear end portion 22C of the fixing housing 2. The intermediate restraint space 6B is formed at the intermediate portion 2B of the fixing housing 2. The front end portion 21C, the rear end portion 22C, and the intermediate portion 2B each function as a "restraint space forming portion" that forms the restraint space 6.

The front-rear end portion 2C includes a pair of side walls 2C1 formed on both sides in the width direction, and a top wall 2C2 connecting the pair of side walls 2C1. The restraint space 6 is formed between the pair of side walls 2C1 and below the top wall 2C2.

The front-rear end portion 2C includes a reinforcing wall 2C3.

The reinforcing wall 2C3 constitutes a wall on the outer side in the front-rear direction of the restraint space 6. The lower surface of the reinforcing wall 2C3 is flush with the lower surfaces of the pair of side walls 2C1 (FIG. 10).

(Press-Fit Portion 2D for Fixing Metal Fitting 5)

A press-fitting portion 2D into which the fixing metal fitting 5 is press-fitted is formed on each of the pair of side walls 2C1 of the front-rear end portion 2C. Note that the press-fitting portion 2D is not formed in the intermediate portion 2B.

Figure 3:
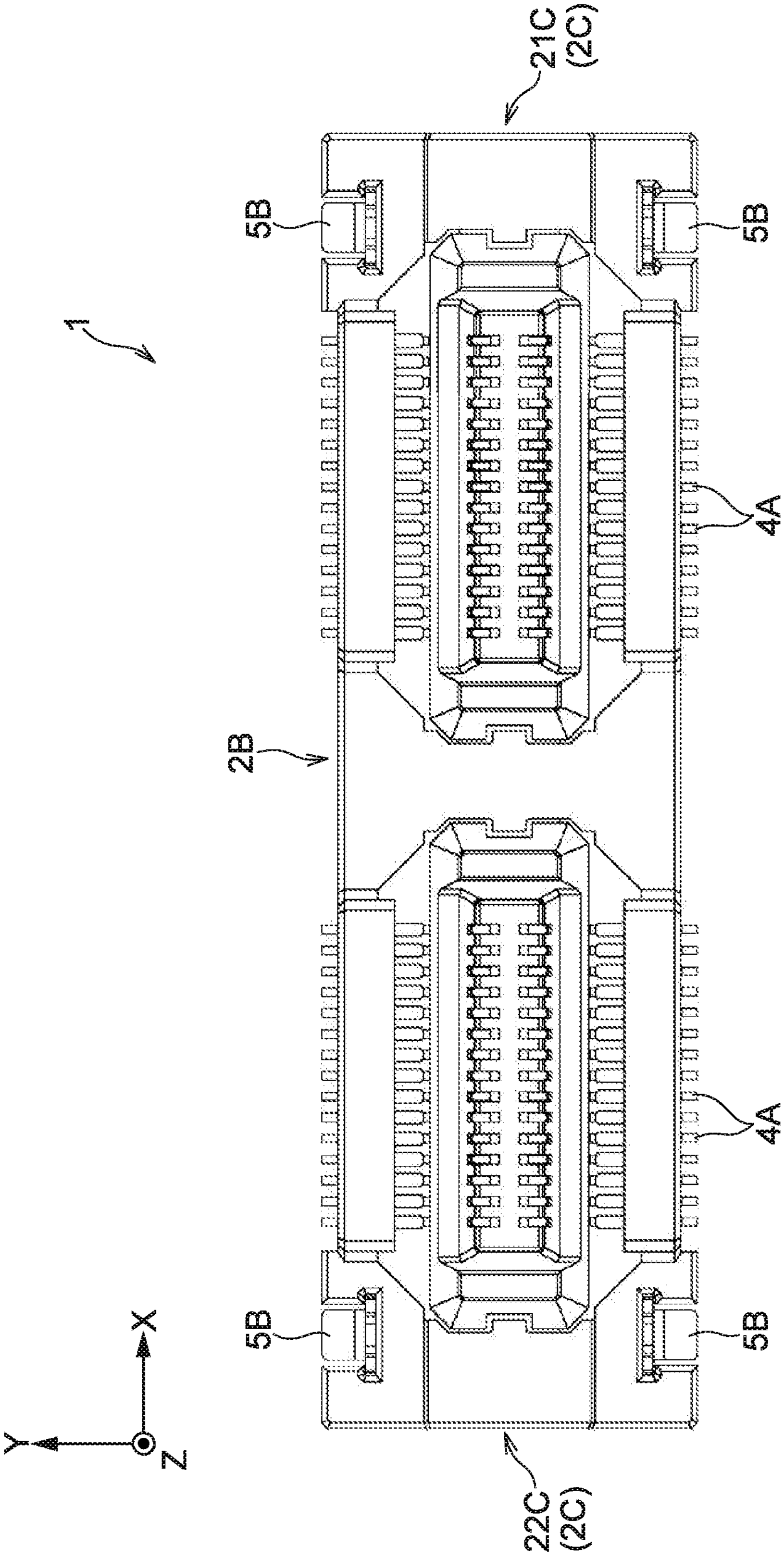
FIG. 3 is a plan view of the connector.
Figure 4:
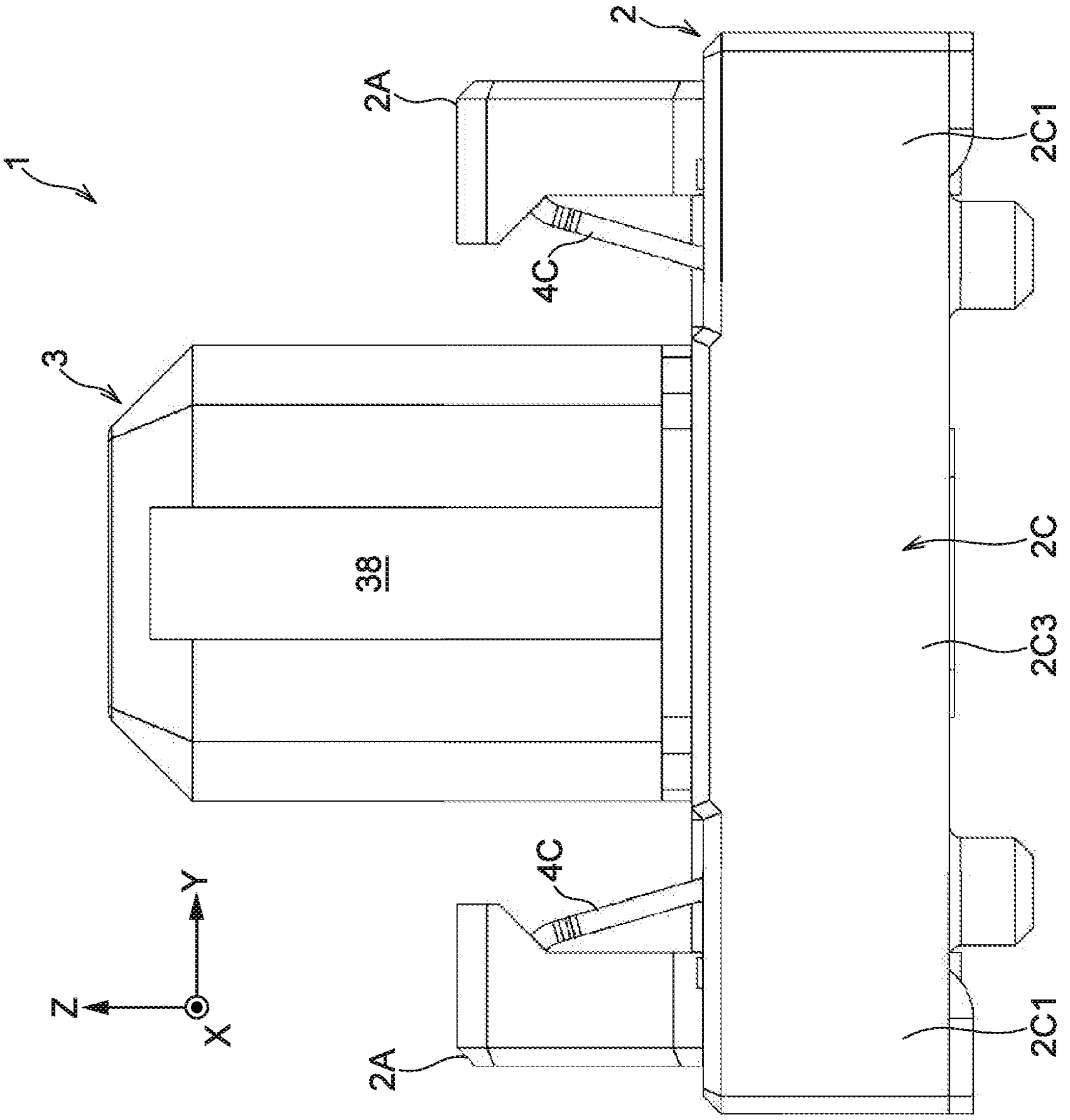
FIG. 4 is a front view of the connector.

The fixing metal fitting 5 is press-fitted into the press-fitting portion 2D from above. In a state where the fixing metal fitting 5 is press-fitted into the press-fitting portion 2D, the substrate fixing portion 5B of the fixing metal fitting 5 does not protrude outward in the width direction from the width direction outer surface of the front-rear end portion 2C (FIG. 3).

(Bulging Portion 2F)

Figure 9:
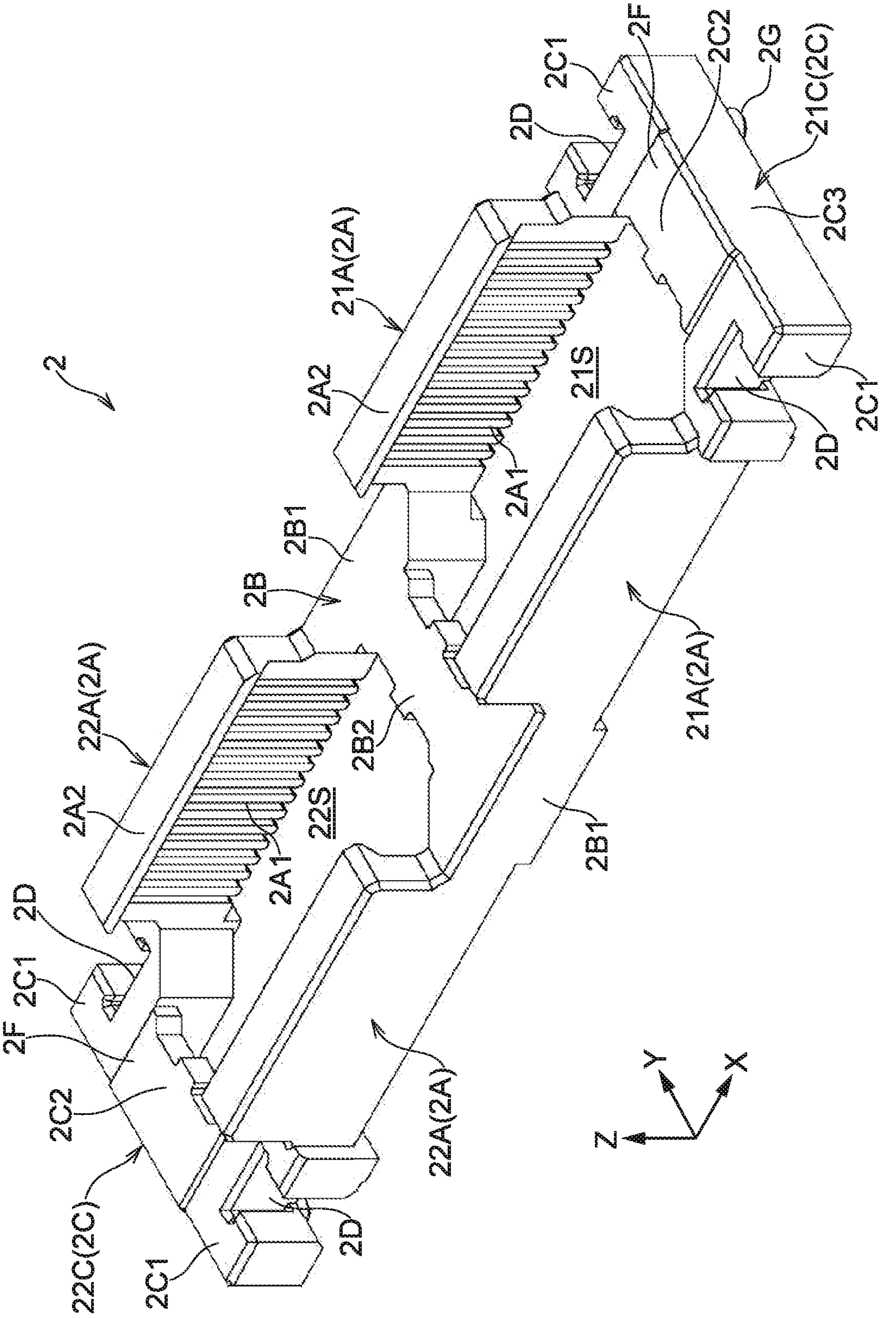
FIG. 9 is a perspective view of a fixing housing.

A bulging portion 2F is formed on the front-rear end portion 2C (FIG. 9).

The bulging portion 2F is formed at the central portion of the front-rear end portion 2C in the width direction. At the position where the bulging portion 2F is formed, the height of the upper surface of the front-rear end portion 2C is slightly higher than the other positions.

(Tail Protecting Portion)

The front-rear end portion 2C also functions as a tail protecting portion for protecting the substrate fixing portions 4A (tail portions) of the plurality of terminals 4. The front-rear end portion 2C protrudes outward in the width direction with respect to the width direction outer surface of the terminal holding portion 2A. The width direction outer surface of the front end portion 21C and the width direction outer surface of the rear end portion 22C are formed on the same plane, and the substrate fixing portions 4A of the plurality of terminals 4 are accommodated inside the virtual plane in the width direction (FIG. 3).

A boss 2G to be inserted into a hole formed in the substrate is formed on the front-rear end portion 2C.

(Intermediate Portion)

The intermediate portion 2B includes the pair of side walls 2B1 formed on both sides in the width direction, and the top wall 2B2 connecting the pair of side walls 2B 1. The intermediate restraint space 6B is formed between the pair of side walls 2B1 and below the top wall 2B2. The intermediate restraint space 6B is a space opened in the downward direction and to both sides in the front-rear direction.

Figure 5:
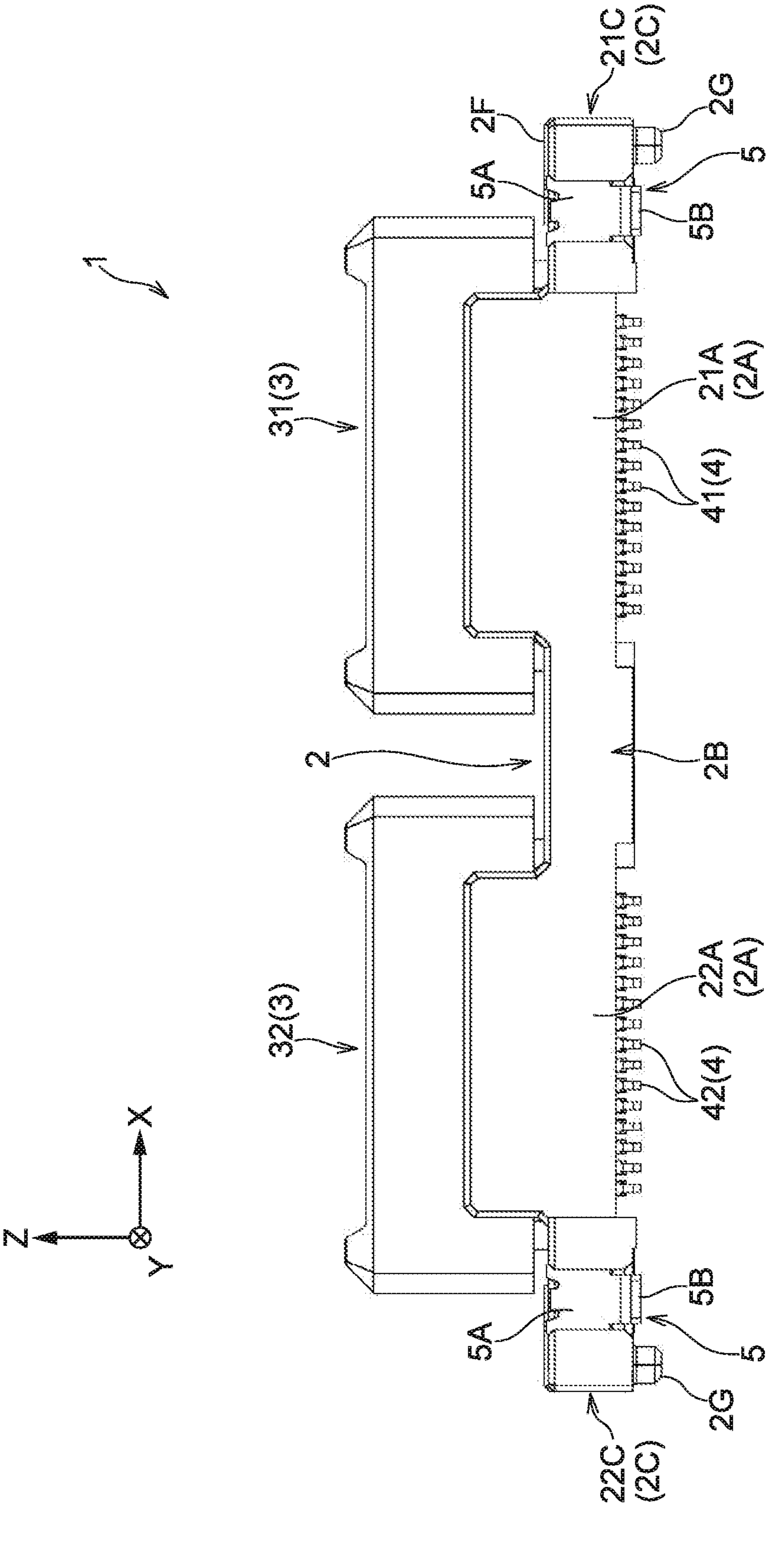
FIG. 5 is a side view of the connector.

As illustrated in FIG. 9, the upper surfaces of the pair of side walls 2B 1 of the intermediate portion 2B and the upper surface of the top wall 2B2 of the intermediate portion 2B are flush with each other. The height of the upper surface of the intermediate portion 2B is the same as the height of the bulging portion 2F of the front-rear end portion 2C (FIG. 5).

(Restriction Surface)

The fixing housing 2 includes a function of restricting a movable range of the movable housing 3 when the movable housing 3 abuts on the fixing housing 2.

Figure 11:
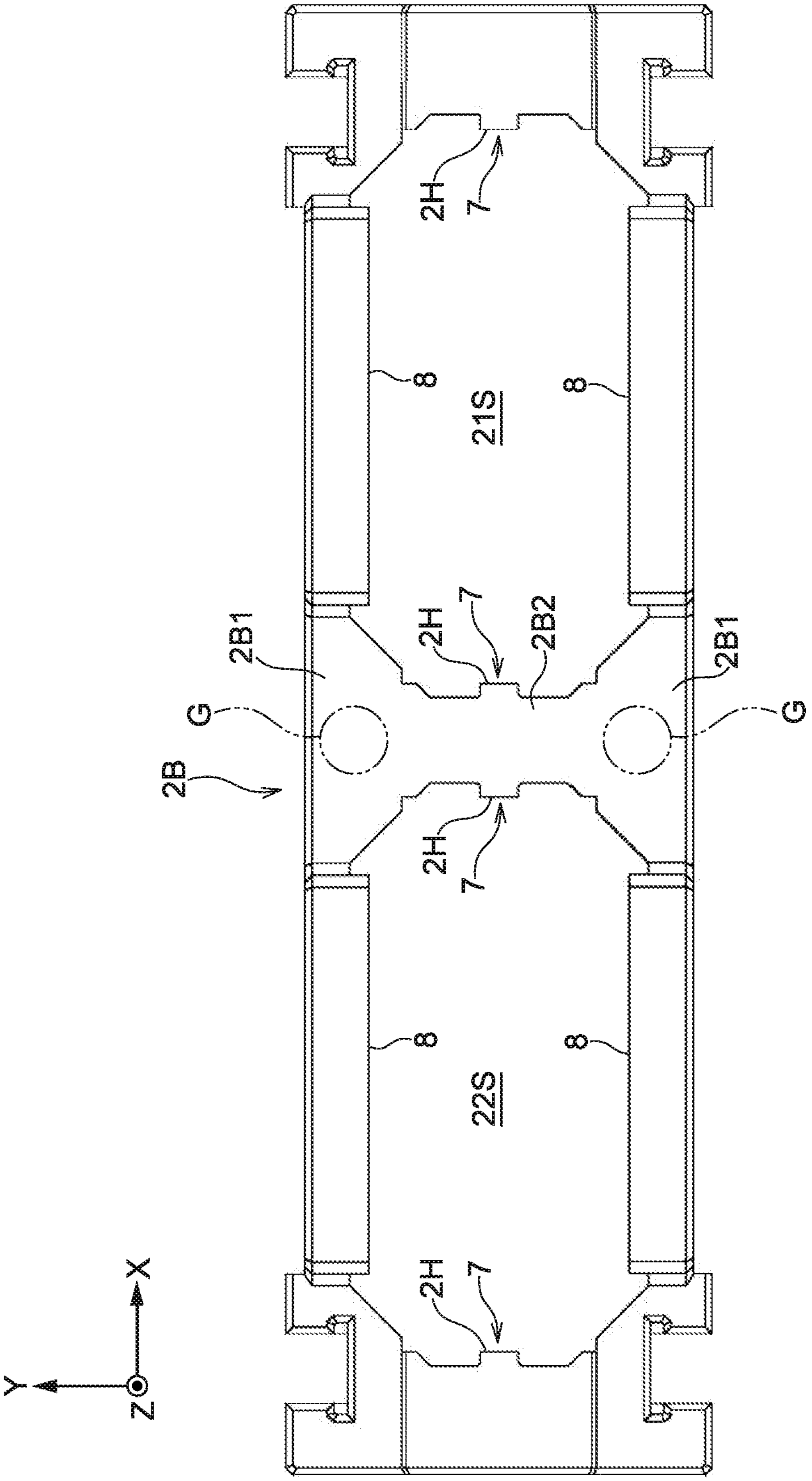
FIG. 11 is a plan view of the fixing housing.
Figure 12:
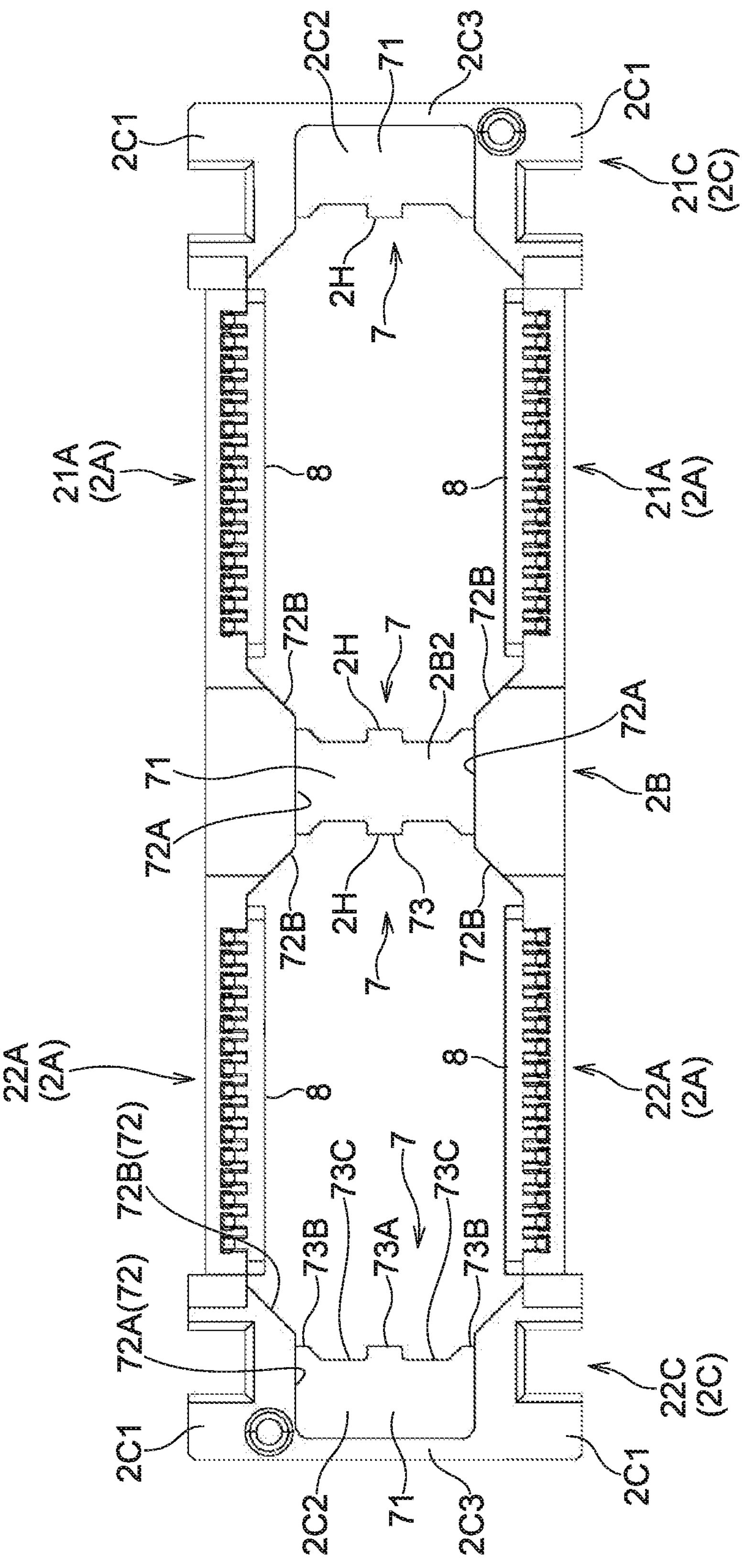
FIG. 12 is a bottom view of the fixing housing.
Figure 13:
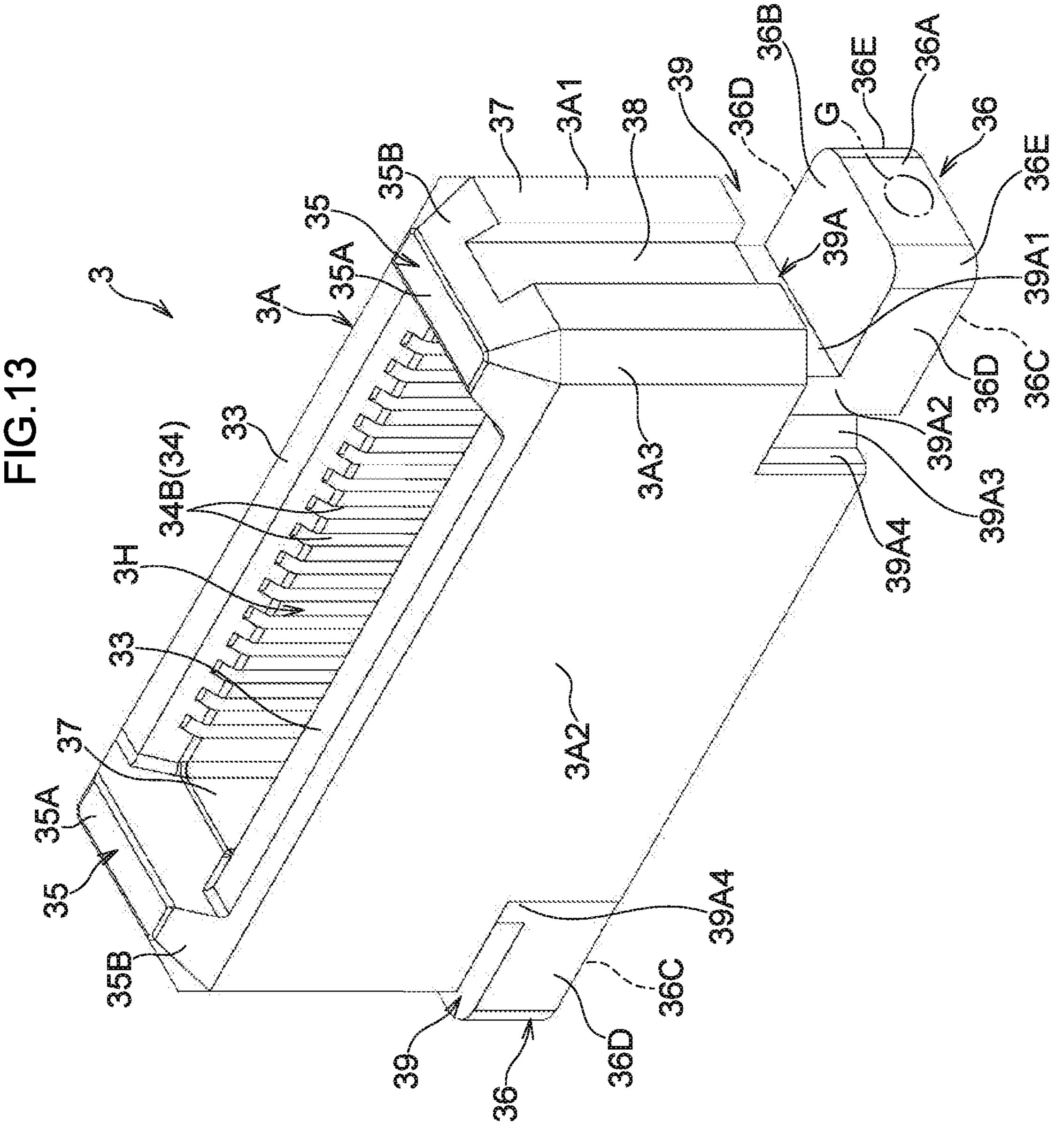
FIG. 13 is a perspective view of a movable housing.

That is, the fixing housing 2 is configured such that the movable housing 3 can abut on the fixing housing 2, and includes restriction surfaces 7 and 8 that restrict the movement of the movable housing 3 to a predetermined movable range (FIG. 11 and FIG. 12).

The restriction surface 7 formed on the front-rear end portion 2C and the restriction surface 7 formed on the intermediate portion 2B are the restriction surfaces 7 having substantially the same configuration.

However, the restriction surface 7 facing the front direction and the restriction surface 7 facing the rear direction are formed in the intermediate portion 2B. The first movable housing 31 can abut on the restriction surface 7 facing the front direction, and the second movable housing 32 can abut on the restriction surface 7 facing the rear direction.

Hereinafter, a specific configuration of the restriction surface 7 will be described.

A lower portion 3C (including the protruding portion 36) of the movable housing 3 can abut on the restriction surface 7.

As illustrated in FIG. 12, the restriction surface 7 includes an upper restriction surface 71 on which the protruding portion 36 of the movable housing 3 abuts, a pair of width direction restriction surfaces 72 on which the protruding portion 36 of the movable housing 3 abuts, and a front-rear restriction surface 73 on which the lower portion 3C of the movable housing 3 abuts.

The upper restriction surface 71 is a lower surface of the top wall 2B2, 2C2. The width direction restriction surfaces 72 are side surfaces of the pair of side walls 2B1, 2C1. The front-rear restriction surface 73 is an end surface of the top wall 2B2, 2C2.

(Front-Rear Restriction Surface 73)

As illustrated in FIG. 12, the front-rear restriction surface 73 includes a central surface 73A, a pair of outer surfaces 73B, and a pair of concave surfaces 73C.

The central surface 73A is formed at the center in the width direction of the top wall 2B2, 2C2. The central surface 73A is a flat surface with the normal direction directed in the front-rear direction. When the movable housing 3 moves in parallel in the front-rear direction from the normal position, a concave portion abutment surface 39A (see FIG. 24) of the movable housing 3 abuts on the central surface 73A.

The pair of outer surfaces 73B are formed at width direction outer end portions of the top wall 2B2 and 2C2. The pair of outer surfaces 73B are flat surfaces with the normal direction directed inward in the front-rear direction. The positions of the outer surfaces 73B in the front-rear direction coincide with the central surface 73A. When the movable housing 3 moves in parallel in the front-rear direction after moving in parallel in any of the width directions from the normal position, the concave portion abutment surface 39A of the movable housing 3 abuts on one of the pair of outer surfaces 73B and the central surface 73A (FIG. 24).

The concave surface 73C is formed between the central surface 73A and the outer surface 73B. The concave surface 73C is recessed in the front-rear direction (direction in which the first arrangement space 21S or the second arrangement space 22S expands in the front-rear direction) with respect to the central surface 73A. The space through which a fitting portion 3B (upper portion 3B) of the movable housing 3 passes at the time of manufacturing the connector is enlarged by the concave surfaces 73C (see FIG. 20).

By forming the pair of concave surfaces 73C, a convex portion 2H protruding in the counter-protruding direction (direction approaching a main body portion 3A of the movable housing 3 in the front-rear direction) is formed between the pair of concave surfaces 73C.

Figure 24:
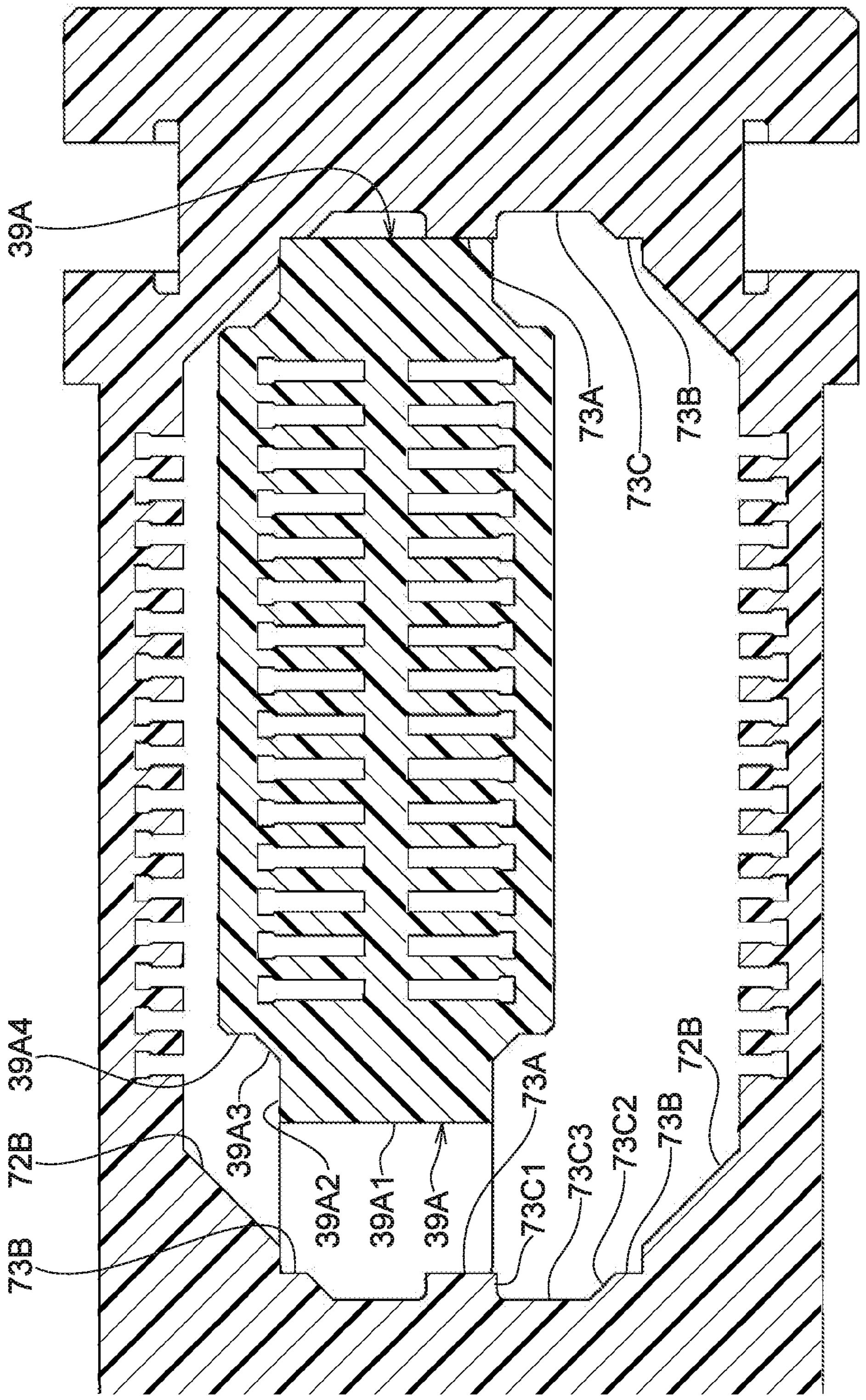
FIG. 24 is a cross-sectional view of a state in which the movable housing has moved to the limit in a front-rear direction and a width direction.

As illustrated in FIG. 24, the concave surface 73C includes a first surface 73C1 adjacent to the central surface 73A, a second surface 73C2 adjacent to the outer surface 73B, and a third surface 73C3 between the first surface 73C1 and the second surface 73C2. The first surface 73C1 faces outward in the width direction. The second surface 73C2 faces inward in the width direction and the oblique direction in the front-rear direction. The third surface 73C3 faces the front-rear direction.

(Width Direction Restriction Surface 72)

The width direction restriction surface 72 includes a pair of width direction surfaces 72A and a pair of inclined surfaces 72B.

The pair of width direction surfaces 72A of the width direction restriction surface 72 are surfaces located on the outer sides of the restraint space 6 in the width direction, and are flat surfaces with the normal direction directed inward in the width direction.

The pair of inclined surfaces 72B of the width direction restriction surface 72 are formed closer to the terminal holding portion 2A than the pair of width direction surfaces 72A. The pair of inclined surfaces 72B obliquely connect the pair of width direction surfaces 72A and the width direction inner surfaces of the side walls 2A1 of the terminal holding portions 2A. The pair of inclined surfaces 72B are flat surfaces with the normal direction directed inward in the width direction and the oblique direction in the front-rear direction.

The inclined surface 72B of the width direction restriction surface 72 is located on the same plane as the second surface 73C2 of the concave surface 73C. As illustrated in FIG. 24, a recessed portion is formed between the inclined surface 72B of the width direction restriction surface 72 and the second surface 73C2 of the concave surface 73C so as to correspond to the outer surface 73B. When the movable housing 3 moves in parallel in the front-rear direction after moving in parallel in any of the width directions from the normal position, a part of the movable housing 3 enters the recessed portion.

(Restriction Surface 8 Formed on Terminal Holding Portion 2A)

As illustrated in FIG. 7, a restriction surface 8 is a restriction surface formed on the upper wall 2A2 of the terminal holding portion 2A, and the width direction outer surface 3A2 of the movable housing 3 can abut on the restriction surface 8.

<<Movable Housing 3>>

The movable housing 3 will be described with reference to FIGS. 13 to 17 and the like.

(Main Body Portion 3A)

The movable housing 3 includes the main body portion 3A.

The main body portion 3A has a substantially rectangular parallelepiped shape, and includes a pair of front-rear direction outer surfaces 3A1 with the normal direction directed outward in the front-rear direction, and a pair of width direction outer surfaces 3A2 with the normal direction directed outward in the width direction. In addition, the main body portion 3A includes four connection surfaces 3A3 that obliquely connect the front-rear direction outer surface 3A1 and the width direction outer surface 3A2. The front-rear direction outer surface 3A1, the width direction outer surface 3A2, and the connection surface 3A3 are each flush in the up-down direction of the main body portion 3A. However, the front-rear direction outer surface 3A1 and the connection surface 3A3 are formed only in the upper portion 3B of the movable housing 3 due to an influence of formation of an entry concave portion 39.

An insertion space 3H into which a part (fitting portion) of the mating connector as a connection object is inserted is formed in the main body portion 3A. The insertion space 3H is opened upward. By forming the insertion space 3H in the main body portion 3A, a pair of front-rear direction walls 37 facing each other in the front-rear direction with the insertion space 3H interposed therebetween, and a pair of width direction walls 33 facing each other in the width direction with the insertion space 3H interposed therebetween are formed in the main body portion 3A.

The main body portion 3A includes a first terminal arrangement portion 34 in which a part (movable-side held portion 4D, distal end elastic portion 4E, and contact portion 4F) of the terminal 4 is arranged.

The first terminal arrangement portion 34 includes terminal arrangement grooves 34B formed in a width direction inner surface of the width direction wall 33, and terminal arrangement holes 34A formed below the terminal arrangement grooves 34B and penetrating in the up-down direction. The movable-side held portion 4D of the terminal 4 is arranged in the terminal arrangement hole 34A in a state of being press-fitted and held, and the distal end elastic portion 4E and the contact portion 4F of the terminal 4 are arranged in the terminal arrangement groove 34B.

(Guide Portion 35)

The movable housing 3 includes a pair of front and rear guide portions 35.

The guide portions 35 guide connection with the mating connector.

The guide portions 35 protrude upward. The pair of guide portions 35 are formed on the front and rear sides. The guide portions 35 are formed at positions on the outer sides in the front-rear direction of the insertion space 3H, and are not formed at a position overlapping the insertion space 3H in the front-rear direction. Meanwhile, the guide portion 35 is formed not only at a position overlapping the insertion space 3H in the width direction but also at a position on the outer side in the width direction of the insertion space 3H. The width dimension of the guide portion 35 coincides with the width dimension of the main body portion 3A of the movable housing 3. The guide portion 35 includes a top surface 35A facing upward, and an inclined surface 35B connected to the side surfaces 3A1, 3A2, and 3A3 of the main body portion 3A of the movable housing 3.

(Protruding Portion 36)

The movable housing 3 includes the pair of front and rear protruding portions 36.

The protruding portions 36 (restrained portions) are components for restricting upward movement of the movable housing 3.

The protruding portions 36 are formed at the lower end portion of the movable housing 3. The protruding portions 36 protrude in a direction away from the main body portion 3A in the front-rear direction. Specifically, the protruding portion 36 on the front side protrudes with the front side as the protruding direction, and the protruding portion 36 on the rear side protrudes with the rear side as the protruding direction. A distal end surface 36A of the protruding portion 36 is located at a position farther from the main body portion 3A in the front-rear direction than the front-rear direction outer surface 3A1 of the main body portion 3A.

The protruding portion 36 is disposed in the restraint space 6 of the fixing housing 2, and when the movable housing 3 moves upward, an upper surface 36B of the protruding portion 36 abuts on the top wall 2B2, 2C2 of the fixing housing 2.

The distal end surface 36A of the protruding portion 36 is a surface formed at an end of the protruding portion 36 on the protruding direction side. A gate mark G is formed on the distal end surface 36A.

The upper surface 36B of the protruding portion 36 is a surface that abuts on the lower surface of the top wall 2B2, 2C2 when the movable housing 3 moves in parallel in the upward direction, and is a flat surface with the normal direction directed in the upward direction.

A lower surface 36C of the protruding portion 36 is a surface that abuts on the substrate when the movable housing 3 moves in parallel in the downward direction, and is a plane with the normal direction directed in the downward direction.

A pair of side surfaces 36D of the protruding portion 36 are surfaces that abut on the width direction surfaces 72A formed by the side walls 2B1, 2C1 when the movable housing 3 moves in parallel in the width direction, and are flat surfaces with the normal direction directed outward in the width direction. A curved surface 36E that smoothly connects each of the pair of side surfaces 36D and the distal end surface 36A is formed between each of the pair of side surfaces 36D and the distal end surface 36A.

(Entry Concave Portion 39)

The movable housing 3 includes the entry concave portion 39 forming an entry space 9 into which a part (top wall 2B2 or 2C2) of the fixing housing 2 can enter.

Since the entry concave portion 39 is formed, the cross-sectional shape (cross-sectional shape orthogonal to the up-down direction) of the lower portion 3C of the movable housing 3 is smaller than that of the upper portion 3B of the movable housing 3.

The entry concave portion 39 forms the space (entry space 9) inside the side surface (front-rear direction outer surface 3A1, width direction outer surface 3A2, and connection surface 3A3) of the main body portion 3A in the front-rear direction and the width direction on the side of the lower portion 3C of the movable housing 3 in plan view. The entry concave portions 39 are formed on both sides of the movable housing 3 in the front-rear direction.

The entry concave portion 39 includes the concave portion abutment surface 39A that abuts on the front-rear end portion 2C or the intermediate portion 2B (front-rear restriction surface 73) of the fixing housing 2 when the movable housing 3 moves in a direction perpendicular to the up-down direction.

The concave portion abutment surface 39A faces the direction perpendicular to the up-down direction.

The concave portion abutment surface 39A includes a first surface 39A1, a pair of second surfaces 39A2, a pair of third surfaces 39A3, and a pair of fourth surfaces 39A4.

The first surface 39A1 is a flat surface that is formed at a central portion of the movable housing 3 in the width direction and faces outward in the front-rear direction.

The pair of second surfaces 39A2 are connected to the outer sides of the first surface 39A1 in the width direction. The pair of second surfaces 39A2 are flat surfaces facing outward in the width direction. The second surface 39A2 is flush with the side surface 36D of the protruding portion 36.

The pair of third surfaces 39A3 are formed on the outer sides of the pair of second surfaces 39A2 in the width direction. The pair of third surfaces 39A3 are surfaces facing outward in the width direction and the oblique direction in the front-rear direction.

The pair of fourth surfaces 39A4 are connected to the outer sides of the pair of fourth surfaces 39A4 in the width direction. The pair of fourth surfaces 39A4 are surfaces facing the front-rear direction.

A front-rear dimension L3 of the lower portion 3C of the movable housing 3 is smaller than a front-rear dimension L1 of the upper portion 3B of the movable housing 3. On the other hand, a width dimension of the lower portion 3C of the movable housing 3 is the same as a width dimension of the upper portion 3B of the movable housing 3. However, in the vicinity of the front end and the vicinity of the rear end of the lower portion 3C of the movable housing 3 (portions where the entry concave portions 39 are formed), the width dimension is smaller than that of the upper portion 3B of the movable housing 3.

Figure 19:
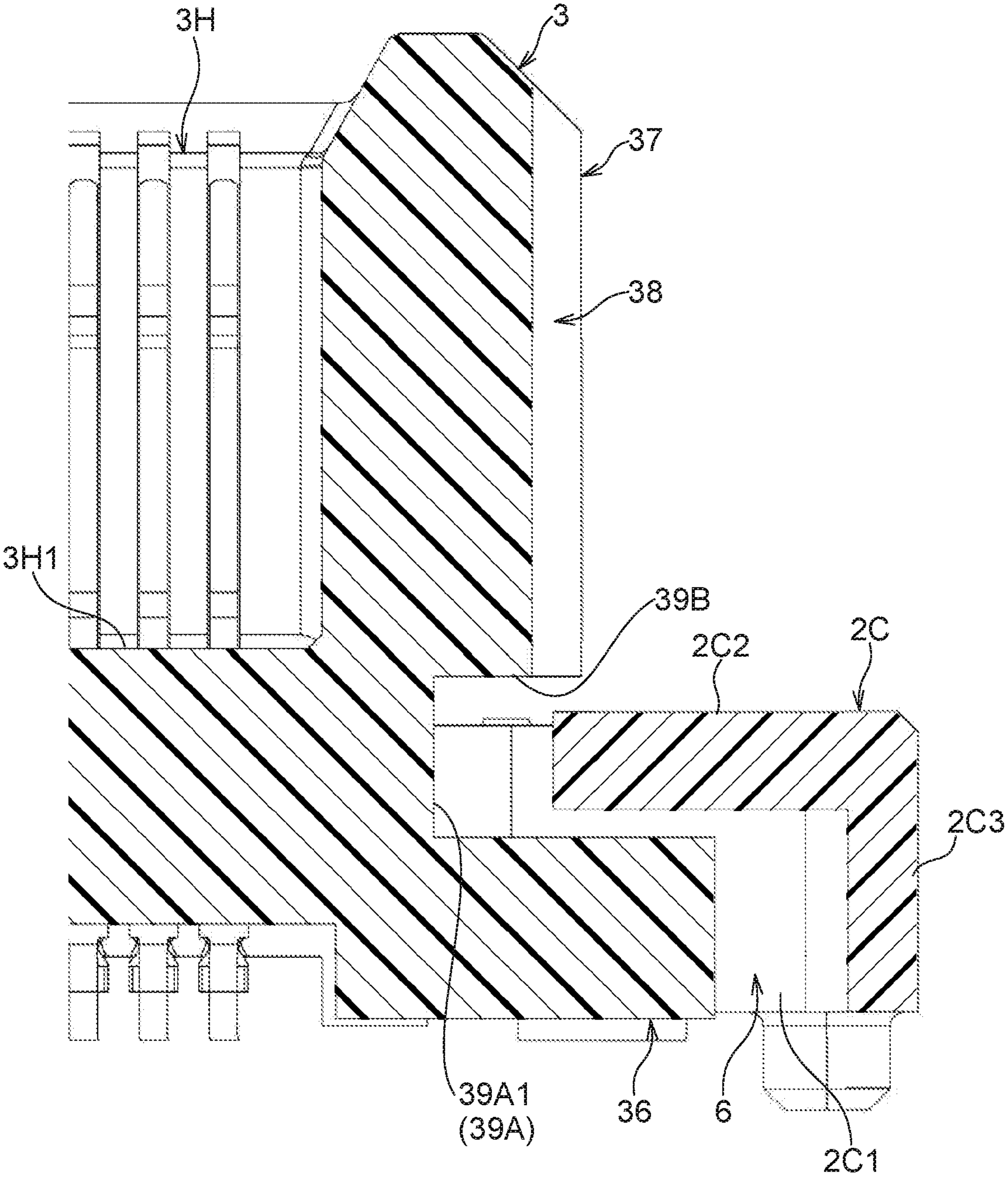
FIG. 19 is an enlarged cross-sectional view of the connector in a state where the movable housing is at a normal position.

An upper surface 39B of the entry concave portion 39 is formed above the entry space 9. The upper surface 39B of the entry concave portion 39 is a flat surface with the normal direction directed in the downward direction. The upper surface 39B of the entry concave portion 39 is located below a bottom surface 3H1 of the insertion space 3H (FIG. 19).

The entry concave portion 39 is formed at a position not overlapping the entire range in the up-down direction of the pair of front-rear direction walls 37 facing each other in the front-rear direction with the insertion space 3H interposed therebetween in the up-down direction. Therefore, the strength of the front-rear direction walls 37 is secured.

(Passage Groove 38)

The movable housing 3 includes passage grooves 38 as "concave portions".

Figure 20:
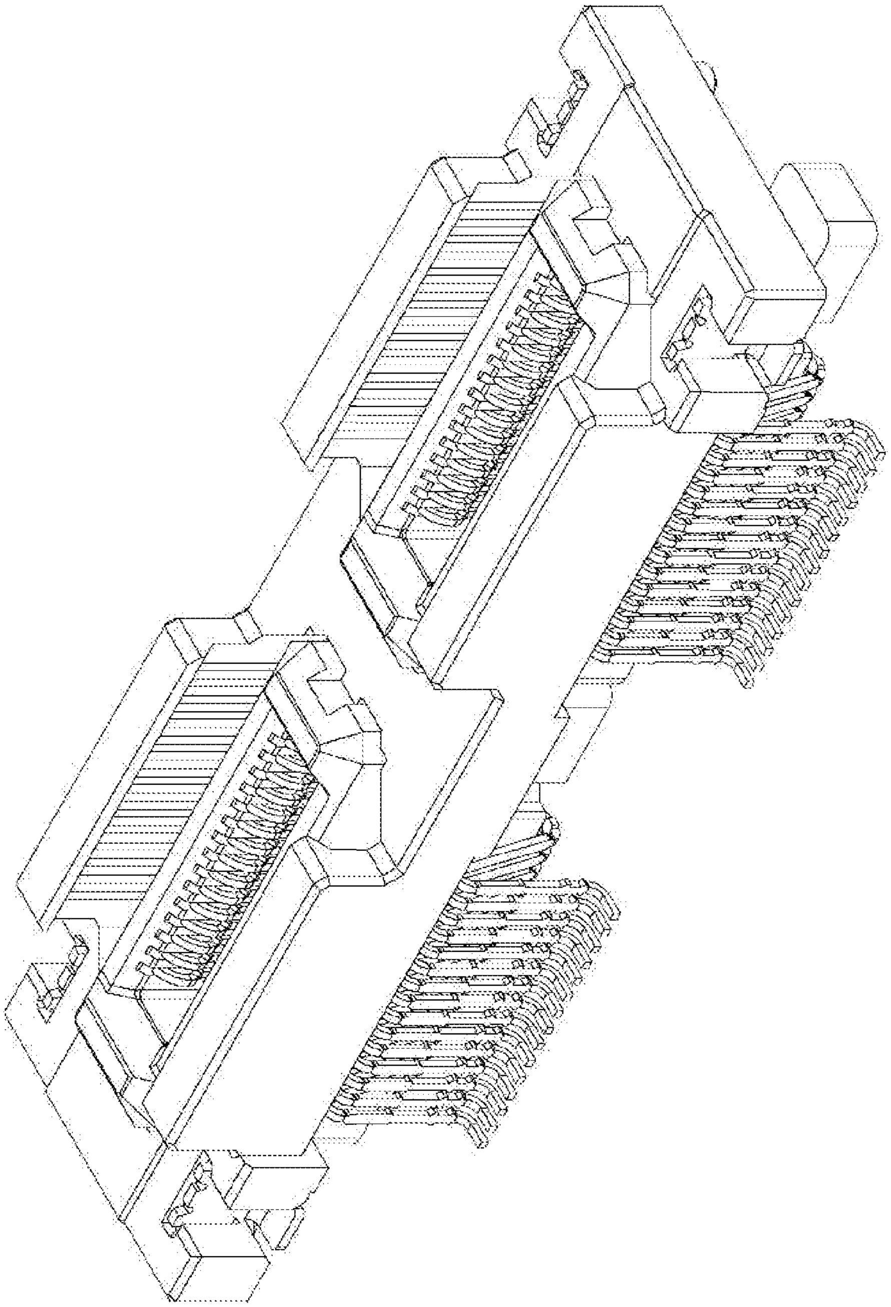
FIG. 20 is a perspective view illustrating a state in the middle of manufacturing the connector. Note that, in this drawing, a procedure of holding a plurality of terminals in the fixing housing after holding the plurality of terminals in the movable housing is illustrated, but the plurality of terminals may be simultaneously held in both the fixing housing and the movable housing after the movable housing is arranged at an appropriate position with respect to the fixing housing.
Figure 21:
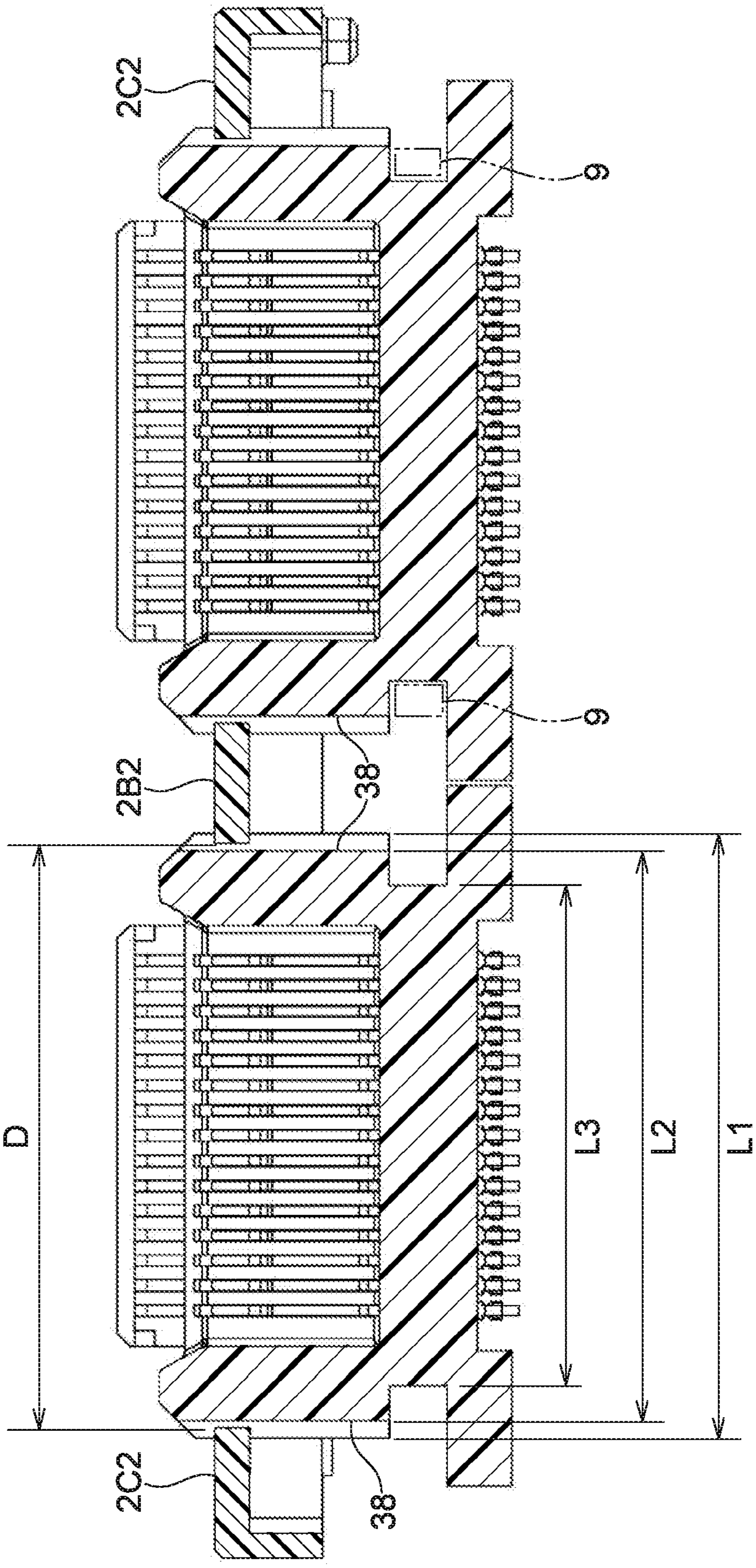
FIG. 21 is a cross-sectional view corresponding to FIG. 20.

Since the passage grooves 38 are formed, when the upper portion 3B of the movable housing 3 passes through the arrangement space 21S, 22S of the fixing housing 2 from the bottom to the top at the time of manufacturing the connector 1, a part (convex portion 2H) of the fixing housing 2 can pass through the passage groove 38 of the movable housing 3 (FIG. 20 and FIG. 21).

The passage grooves 38 are formed in the front-rear direction outer surfaces 3A1 of the upper portion 3B of the movable housing 3. The passage groove 38 is located at the center in the width direction of the movable housing 3. The passage groove 38 extends in the up-down direction with the front-rear direction as the groove depth direction and the width direction as the groove width direction. A cross-sectional shape orthogonal to the extending direction of the passage groove 38 is rectangular. The passage grooves 38 are formed in both of the pair of front-rear direction outer surfaces of the movable housing 3.

As illustrated in FIG. 21, since the passage groove 38 is formed, a front-rear dimension L2 at the position (position in the width direction) where the passage groove 38 is formed in the upper portion 3B of the movable housing 3 is smaller than the front-rear dimension L1 of the upper portion 3B of the movable housing 3. Therefore, although the front-rear dimension L1 of the upper portion 3B of the movable housing 3 is larger than a distance D in the front-rear direction of the pair of front and rear top walls 2B2 and 2C2 with which one movable housing 3 abuts, the upper portion 3B (fitting portion 3B) of the movable housing 3 can pass through the space between the pair of front and rear top walls 2B2 and 2C2 in the up-down direction.

<Functions and Effects>

Next, functions and effects of the embodiment will be described.

<<First Viewpoint>>

In the embodiment, the connector 1 includes the fixing housing 2, the first movable housing 31 having the first fitting portion 3B that can be fitted to a first connection object (mating connector), and the second movable housing 32 having the second fitting portion 3B that can be fitted to a second connection object (mating connector).

The connector 1 includes the first terminals 41 and the second terminals 42. The first terminal 41 includes the first fixing-side held portion 4B held by the fixing housing 2, the first movable-side held portion 4D held by the first movable housing 31, and the first intermediate elastic portion 4C located between the first fixing-side held portion 4B and the first movable-side held portion 4D. The second terminal 42 includes the second fixing-side held portion 4B held by the fixing housing 2, the second movable-side held portion 4D held by the second movable housing 32, and the second intermediate elastic portion 4C located between the second fixing-side held portion 4B and the second movable-side held portion 4D.

The fixing housing 2 includes the first terminal holding portions 21A that hold the first fixing-side held portions 4B of the first terminals 41, and the second terminal holding portions 22A that hold the second fixing-side held portions 4B of the second terminals 42.

Here, if the portion of the fixing housing 2 that holds the first terminal 41 (first terminal holding portion 21A) and the portion of the fixing housing 2 that holds the second terminal 42 (second terminal holding portion 22A) are separate bodies, there is a possibility that the relative positions of the first fixing-side held portion 4B of the first terminal 41 and the second fixing-side held portion 4B of the second terminal may deviate from predetermined positions.

On the other hand, in the embodiment, since the first terminal holding portion 21A and the second terminal holding portion 22A of the fixing housing 2 are integrally molded with resin, the relative positions of the first fixing-side held portion 4B of the first terminal 41 and the second fixing-side held portion 4B of the second terminal 42 are prevented from deviating from the predetermined positions.

In the embodiment, the gate mark G (which means a mark formed at a position corresponding to a gate through which a molten resin flows into a molding die) is formed in the intermediate portion 2B connecting the first terminal holding portion 21A and the second terminal holding portion 22A (FIG. 11).

Therefore, when the fixing housing 2 is molded, the molten resin can flow in from a portion located between the first terminal holding portion 21A and the second terminal holding portion 22A. Therefore, the molten resin can efficiently flow in the molding die, and it is possible to prevent a decrease in the strength of the fixing housing 2 and distortion of the shape of the fixing housing 2.

In particular, in the embodiment, since the press-fitting portion 2D into which the fixing metal fitting 5 is press-fitted is not formed in the intermediate portion 2B of the fixing housing 2, the molten resin can smoothly flow from the intermediate portion 2B. Since the fixing metal fittings 5 are disposed at the four corners of the fixing housing 2, the fixing of the fixing housing 2 to the substrate (attachment object) is sufficiently reinforced.

It is preferable that the weld line, which is a portion where the molten resins flowing in the molding die collide with each other, is formed at the front-rear end portion 2C connecting the pair of terminal holding portions. This is because the request for strength is lower in the front-rear end portion 2C than in the terminal holding portion 2A.

In the embodiment, the fixing housing 2 has an accommodation space (first arrangement space 21S and second arrangement space 22S, FIG. 11) that penetrates the fixing housing 2 in the up-down direction and accommodates the first movable housing 31 and the second movable housing 32. The accommodation space (first arrangement space 21S and second arrangement space 22S) is divided into the first accommodation space 21S in which the first movable housing 31 is accommodated and the second accommodation space 22S in which the second movable housing 32 is accommodated by the intermediate connection portion (top wall 2B2 of the intermediate portion 2B) of the fixing housing 2.

Therefore, it is possible to prevent the resin constituting the fixing housing 2 from contracting at the time of molding the fixing housing 2 and the fixing housing 2 from being deformed due to the contraction.

In the embodiment, the intermediate connection portion (top wall 2B2 of the intermediate portion 2B) restricts the upward movement of the first movable housing 31 and restricts the upward movement of the second movable housing 32 by abutting on the second movable housing 32.

Therefore, the intermediate connection portion can be caused to function effectively.

In addition, in the embodiment, a first upper abutment portion (protruding portion 36) of the first movable housing 31 restricts the upward movement of the first movable housing 31 by abutting on a first upper restriction portion (top walls 2B2 and 2C2) of the fixing housing 2, and a second upper abutment portion (protruding portion 36) of the second movable housing 32 restricts the upward movement of the second movable housing 32 by abutting on a second upper restriction portion (top walls 2B2 and 2C2) of the fixing housing 2.

Here, the first upper abutment portion (protruding portion 36) and the second upper abutment portion (protruding portion 36) protrude in the arrangement direction (front-rear direction in the embodiment) that is the direction in which the first movable housing 31 and the second movable housing 32 are arranged.

Therefore, it is easy to downsize the connector 1 in a direction perpendicular to the arrangement direction (width direction in the embodiment) among the directions perpendicular to the up-down direction.

<<Second Viewpoint>>

Next, functions and effects of the embodiment will be described from other viewpoints.

In the embodiment, as illustrated in FIG. 19, the connector 1 includes the fixing housing 2 and the movable housings 3. The movable housing 3 includes the protruding portions 36 protruding in the protruding direction that is a direction perpendicular to the up-down direction. The fixing housing 2 includes the restraint space forming portions (front-rear end portions 2C) that each form the restraint space 6 that is a space in which the protruding portion 36 is restrained. The restraint space forming portion (front-rear end portion 2C) includes the pair of side walls 2A1 located on the sides of the protruding portion 36, and the top wall 2C2 located above the protruding portion 36. The top wall 2B2 restricts the upward movement of the movable housing 3 when the protruding portion 36 abuts on the top wall 2B2.

Here, the restraint space forming portion (front-rear end portion 2C) includes the reinforcing wall 2C3 located on the protruding direction side with respect to the protruding portion 36 and connecting the pair of side walls 2A1.

Therefore, the vicinity of the top wall 2C2 in the restraint space forming portion (front-rear end portion 2C) is reinforced by the reinforcing wall 2C3, and breakage of the restraint space forming portion (front-rear end portion 2C) is prevented.

Figure 22:
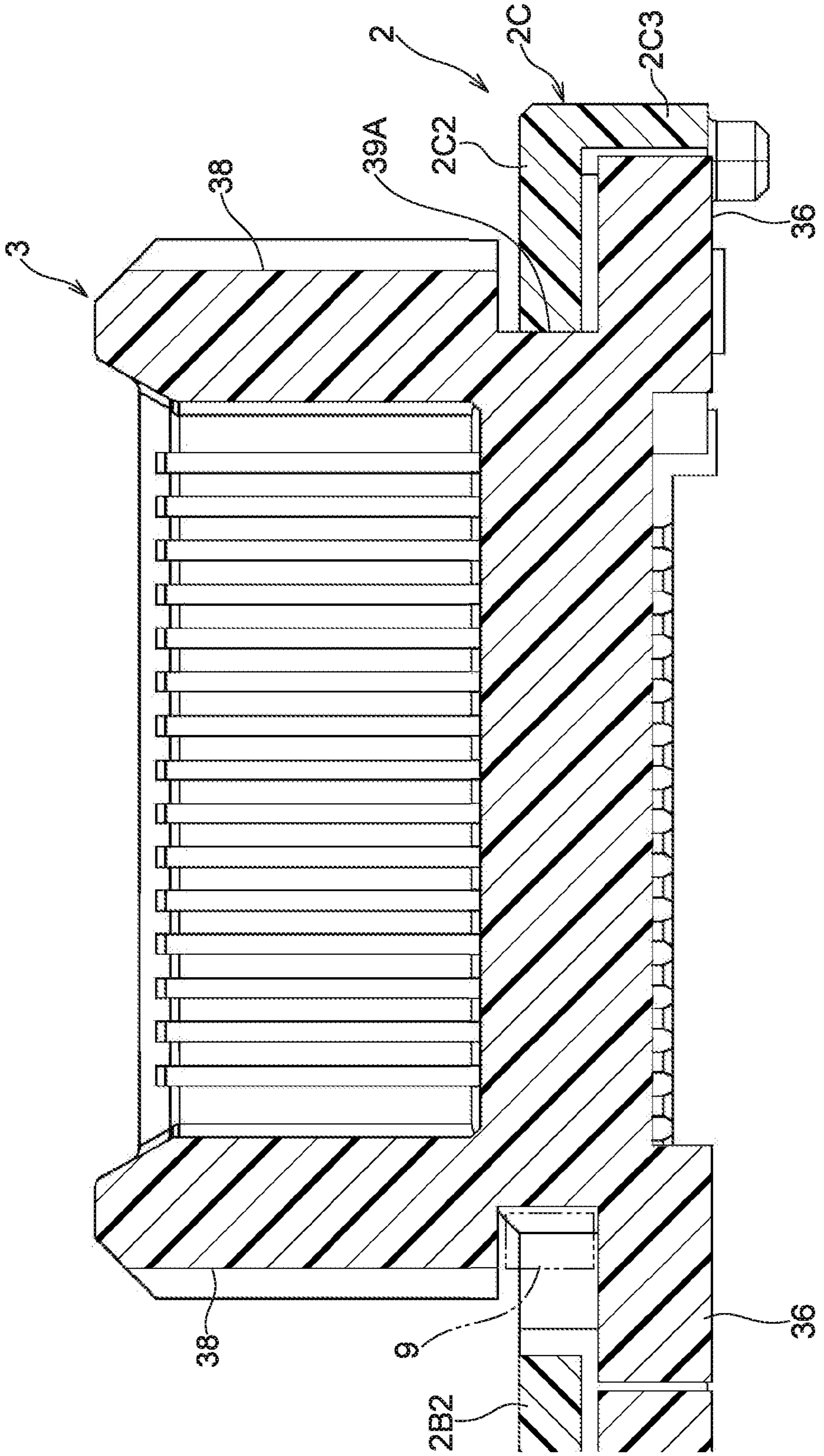
FIG. 22 is a cross-sectional view of a state in which the movable housing has moved forward to the limit.

In addition, in the embodiment, even when the movable housing 3 moves in parallel to the limit in the protruding direction (front-rear direction in the embodiment), the protruding portion 36 does not abut on the reinforcing wall 2C3 (FIG. 22). Therefore, the strength required for the reinforcing wall 2C3 itself is low. Therefore, the reinforcing wall 2C3 can be thinned, and the fixing housing 2 can be downsized.

Further, according to the embodiment, the connector 1 in which the gate mark G (FIG. 13) is formed on a protruding end surface (distal end surface 36A) of the protruding portion 36 is effective when the restraint space forming portion (front-rear end portions 2C) is formed low.

That is, in the movable housing 3 in which the gate mark G is formed on the protruding end surface 36A of the protruding portion 36, when the size of the gate for injecting the molten resin is secured, there is a limit to downsizing of the protruding portion 36. As a result, the restraint space 6 in which the protruding portion 36 is restrained also needs to have a certain size. In order to reduce the height of the restraint space forming portion (front-rear end portion 2C) of the fixing housing 2 while accommodating the protruding portion 36 having a limit of downsizing, it is conceivable to thin the top wall 2C2. However, when the top wall 2C2 is thinned, the restraint space forming portion may be damaged near the thinned top wall 2C2 when the movable housing 3 strongly abuts against the fixing housing 2. Therefore, by providing the reinforcing wall 2C3, breakage of the restraint space forming portion is prevented.

<<Third Viewpoint>>

Next, functions and effects of the embodiment will be described from other viewpoints.

In the embodiment, the connector 1 includes the fixing housing 2, the first movable housing 31 having the first fitting portion 3B that can be fitted to the first connection object, the second movable housing 32 having the second fitting portion 3B that can be fitted to the second connection object, the first terminals 41, and the second terminals 42.

The first movable housing 31 and the second movable housing 32 are arranged in a predetermined arrangement direction (front-rear direction) that is a direction perpendicular to the up-down direction. The first movable housing 31 includes a first side protruding portion 36 (protruding portion 36 on the rear side of the pair of front and rear protruding portions 36 of the first movable housing 31) protruding in a direction (rear direction) perpendicular to the up-down direction and toward the second movable housing 32, and the second movable housing 32 includes a second side protruding portion 36 (protruding portion 36 on the front side of the pair of front and rear protruding portions 36 of the second movable housing 32) protruding in a direction (front direction) perpendicular to the up-down direction and toward the first movable housing 31.

In addition, the fixing housing 2 includes the restraint space forming portion (intermediate portion 2B) that forms the restraint space (intermediate restraint space 6B) that is a space in which both the first side protruding portion 36 and the second side protruding portion 36 are restrained. The restraint space forming portion 2B has the top wall 2B2 located above the first side protruding portion 36 and the second side protruding portion 36, and the top wall 2B2 restricts the upward movement of the first movable housing 31 and the second movable housing 32 when the first side protruding portion 36 and the second side protruding portion 36 abut on the top wall 2B2.

Here, the restraint space 6B has a shared restraint space in which both the first side protruding portion 36 and the second side protruding portion 36 can be positioned.

Therefore, for example, when the first movable housing 31 moves in a direction away from the second movable housing 32 (front direction), the second side protruding portion 36 of the second movable housing 32 can move to the space where the first side protruding portion 36 was located before the movement. For example, when the second movable housing 32 moves in a direction away from the first movable housing, the first side protruding portion 36 of the first movable housing 31 can move to the space where the second side protruding portion 36 was located before the movement. That is, at least a part of the restraint space 6B is shared by the first side protruding portion 36 and the second side protruding portion 36.

Therefore, the connector can be easily downsized in the arrangement direction.

In the embodiment, in the normal state (state illustrated in FIGS. 5 and 6), the first side protruding portion 36 and the second side protruding portion 36 are close to each other in the arrangement direction (front-rear direction). Specifically, the interval between the first side protruding portion 36 and the second side protruding portion 36 in the arrangement direction (front-rear direction) in the normal state is smaller than the distance by which the first movable housing 31 can move in the direction (rear direction) of approaching the second movable housing 32 from the normal state, and is smaller than the distance by which the second movable housing 32 can move in the direction (front direction) of approaching the first movable housing 31 from the normal state. More specifically, the interval between the first side protruding portion 36 and the second side protruding portion 36 in the arrangement direction (front-rear direction) in the normal state is ⅕ or less of the distance by which the first movable housing 31 can move in the direction (rear direction) of approaching the second movable housing 32 from the normal state, and ⅕ or less of the distance by which the second movable housing 32 can move in the direction (front direction) of approaching the first movable housing 31 from the normal state.

Therefore, the connector 1 can be more easily downsized in the arrangement direction.

In the embodiment, a mating connector (not illustrated) as a connection object of the connector 1 includes a first fitting portion (not illustrated) as a first connection object and a second fitting portion (not illustrated) as a second connection object, and the mating connector is configured such that the first fitting portion and the second fitting portion are not relatively displaced from each other.

Further, in the embodiment, as illustrated in FIG. 6, when the interval between the first side protruding portion 36 and the second side protruding portion 36 in the arrangement direction (front-rear direction) in the normal state is d, d>0 is established, but d=0 may be established. That is, in the normal state, the first side protruding portion 36 and the second side protruding portion 36 may be in contact with each other in the arrangement direction.

Other Aspects

Next, functions and effects of the embodiment will be described from other viewpoints.

Figure 14:
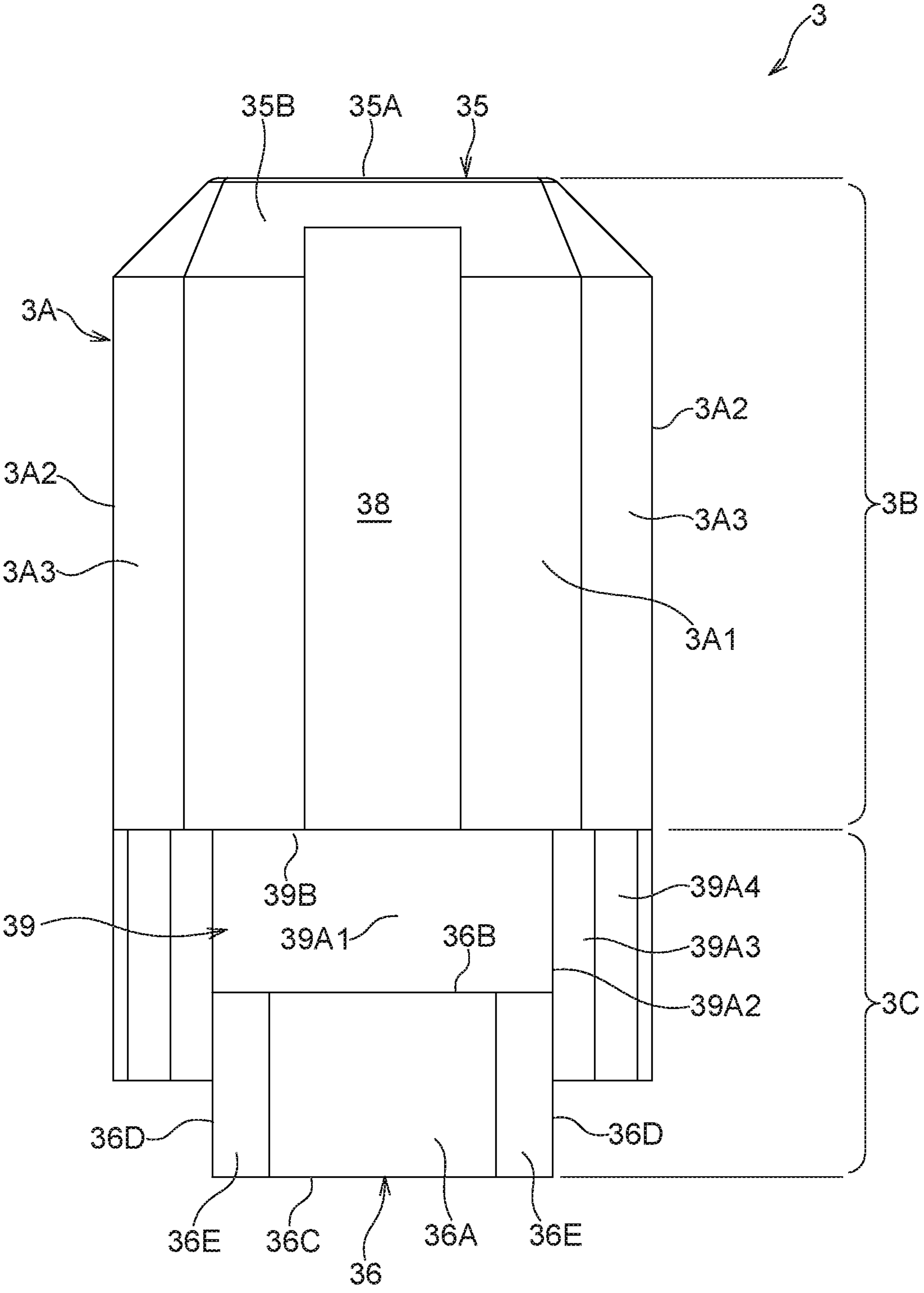
FIG. 14 is a front view of the movable housing.
Figure 15:
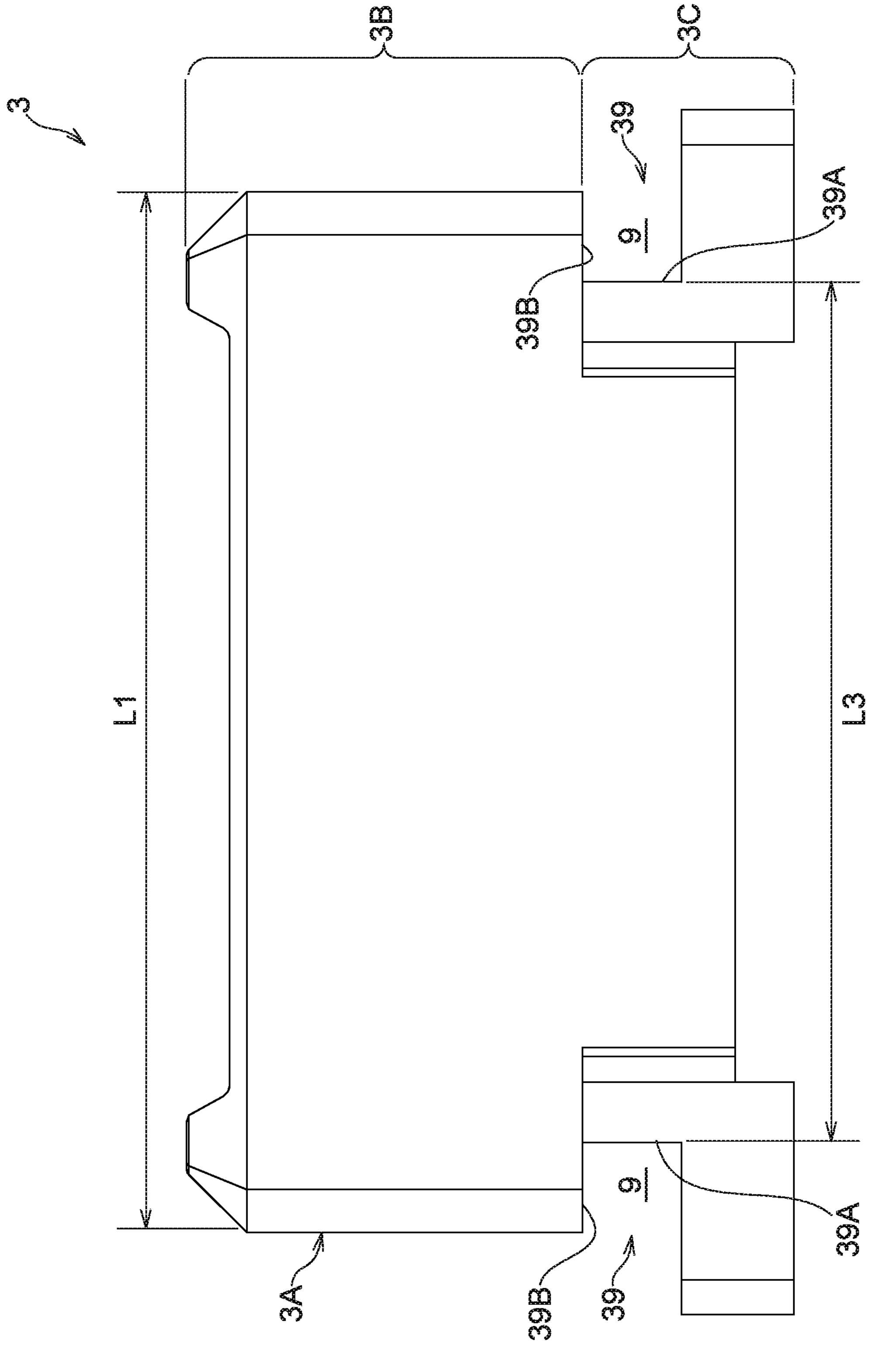
FIG. 15 is a side view of the movable housing.
Figure 16:
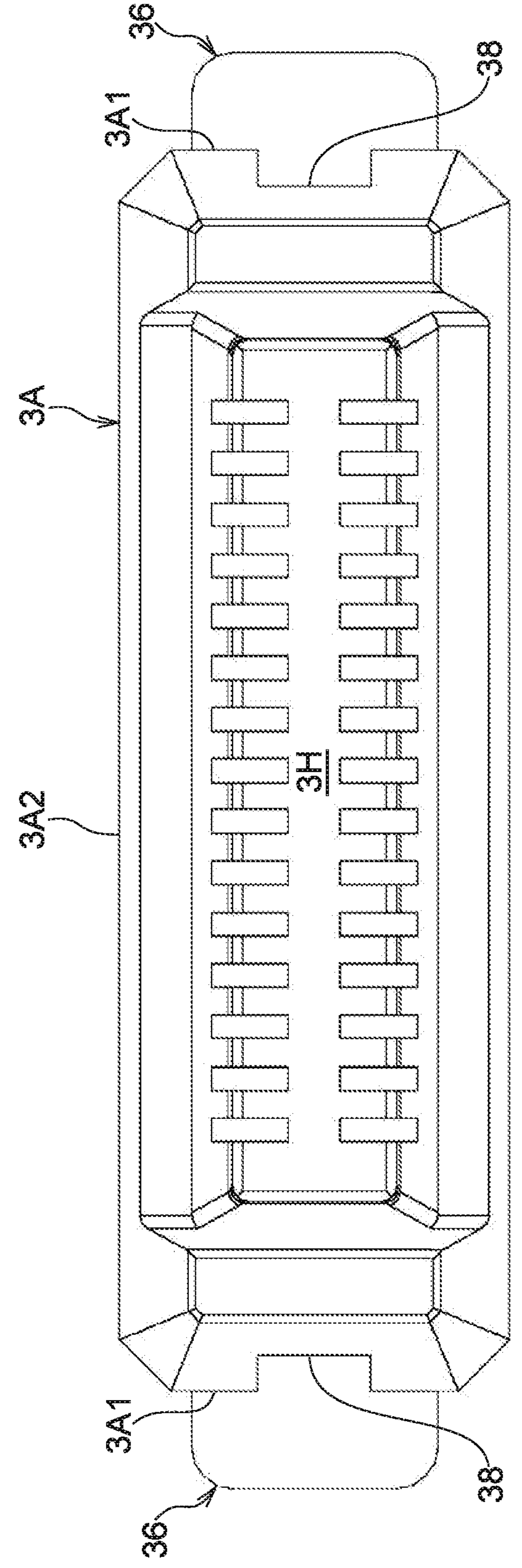
FIG. 16 is a plan view of the movable housing.
Figure 17:
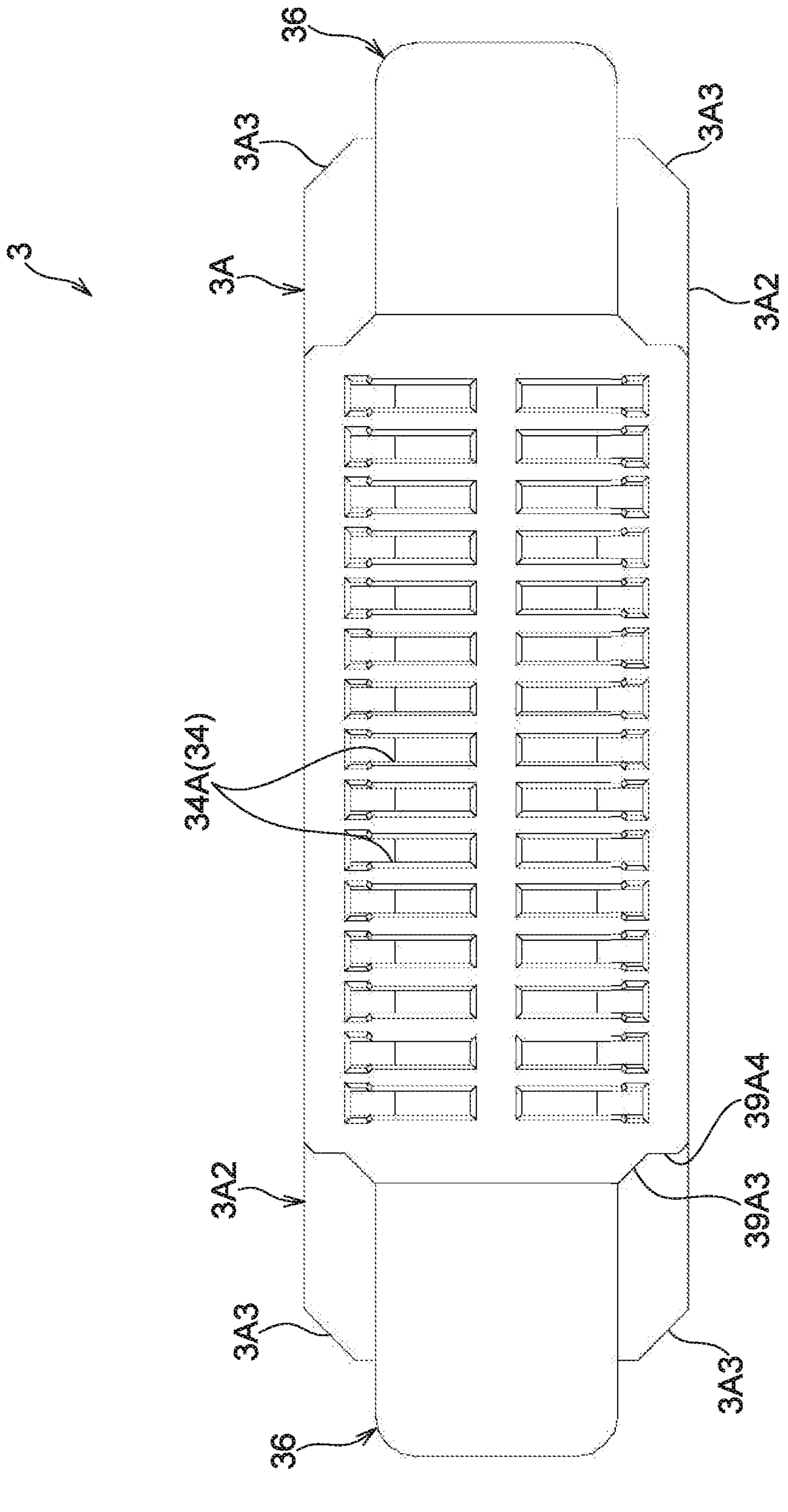
FIG. 17 is a bottom view of the movable housing.
Figure 18:
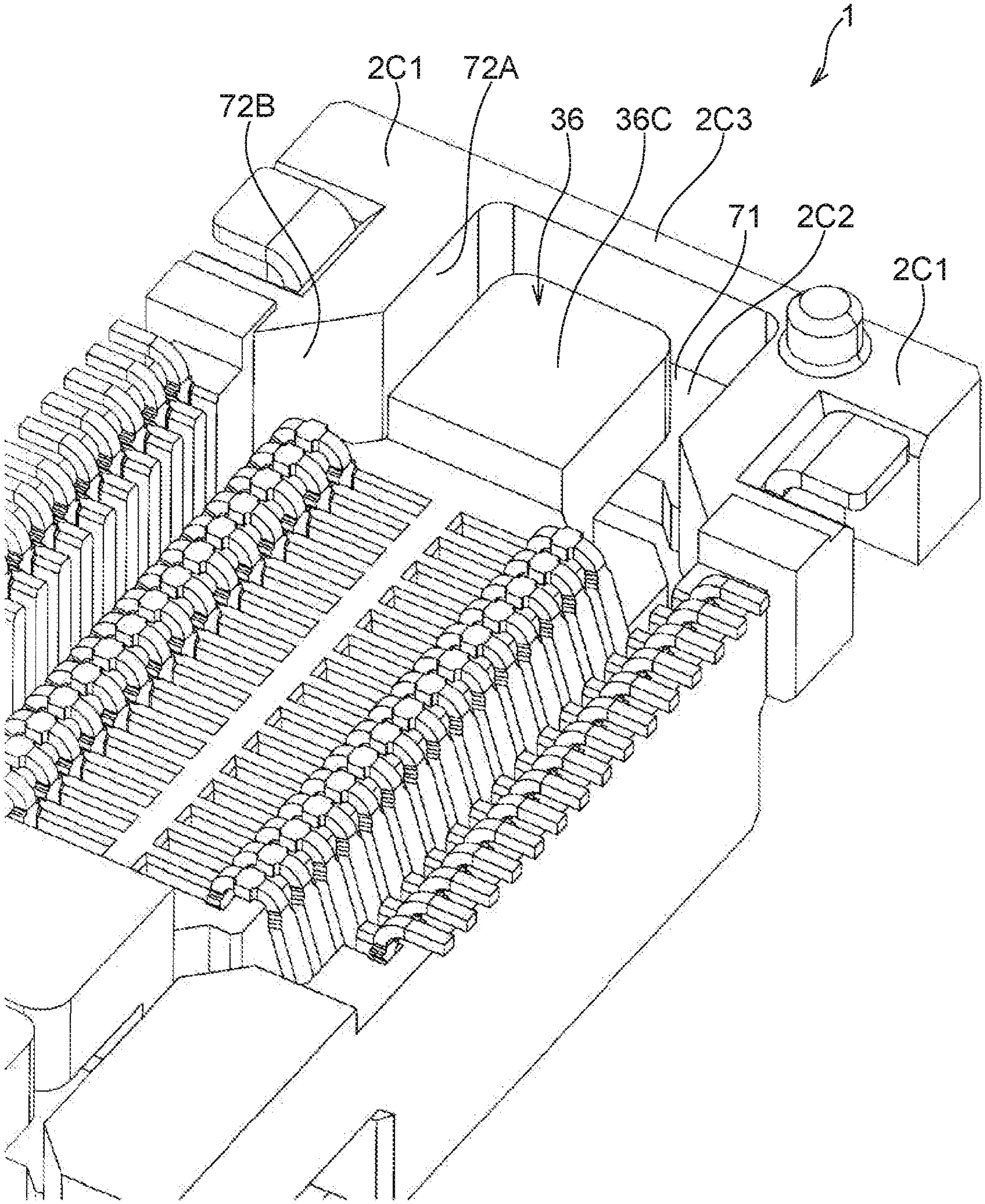
FIG. 18 is an enlarged perspective view of the connector as viewed from below.

In the embodiment, the connector 1 includes the fixing housing 2 and the movable housings 3. The movable housing 3 includes the upper portion 3B and the lower portion 3C (FIG. 14 and FIG. 15). The fixing housing 2 includes portions (top walls 2B2 and 2C2 as entry portions) disposed on the sides of the lower portion 3C of the movable housing 3.

Here, the lower portion 3C of the movable housing 3 is configured such that the entry spaces 9 located below the upper portion 3B are formed on the sides of the lower portion 3C. Then, when the movable housing 3 moves in a direction perpendicular to the up-down direction (front-rear direction in the embodiment), the entry portions (top walls 2B2 and 2C2) can enter the entry spaces 9 (FIG. 22).

For this reason, unlike a connector in which a space located below the upper portion 3B of the movable housing 3, in which a part of the fixing housing 2 can enter when the movable housing 3 moves in the direction perpendicular to the up-down direction, is not formed on the side of the lower portion 3C, the movable range of the movable housing 3 in the horizontal direction (direction perpendicular to the up-down direction) can be increased while securing the size of the upper portion 3B of the movable housing 3.

In the embodiment, the upper portion 3B of the movable housing 3 is the fitting portion 3B, but it goes without saying that the above effect is not limited to the case where the upper portion 3B is the fitting portion 3B.

Further, in the embodiment, the movable housing 3 includes the protruding portions 36 protruding in the protruding direction that is a direction perpendicular to the up-down direction. The entry portions (top walls 2B2 and 2C2) are "upper restriction portions" that restrict the upward movement of the movable housing 3 when the protruding portions 36 abut on the entry portions (top walls 2B2 and 2C2).

Therefore, according to the embodiment, in the connector 1 in which the fixing housing 2 includes the "upper restriction portions" for restricting the upward movement of the movable housing 3, it is possible to increase the displacement amount of the movable housing 3 in the horizontal direction while securing the size of the upper portion 3B of the movable housing 3.

In the embodiment, the fixing housing 2 includes facing portions (top walls 2B2 and 2C2) facing the entry portions (top walls 2B2 and 2C2) in the protruding direction. A passage space (arrangement space 21S, 22S) is formed between the entry portions (top walls 2B2 and 2C2) and the facing portions (top walls 2B2 and 2C2), and the passage space (arrangement space 21S, 22S) is configured such that the upper portion 3B of the movable housing 3 can pass in the up-down direction.

Therefore, in the connector 1 in which the passage space (arrangement space 21S, 22S) formed in the fixing housing 2 needs to be passed by the upper portion 3B of the movable housing 3, it is possible to increase the displacement amount of the movable housing 3 in the horizontal direction while securing the size of the upper portion 3B of the movable housing 3.

In the embodiment, the entry portion (top wall 2B2, 2C2) includes the convex portion 2H protruding inward in a first direction (direction perpendicular to the up-down direction and approaching the center side of the movable housing 3). The upper portion 3B of the movable housing 3 includes the concave portion (passage groove 38) concave portioned inward in the first direction. The concave portion (passage groove 38) is configured such that the convex portion 2H can pass in the up-down direction.

Since the convex portion 2H of the entry portion (top wall 2B2, 2C2) functions as the "upper restriction portion", the upward movement of the movable housing 3 is more reliably restricted. The convex portion 2H passes through the concave portion (passage groove 38) of the upper portion 3B of the movable housing 3 at the time of assembling the connector, and can enter the entry space 9 after assembly (FIG. 20 and FIG. 21). Furthermore, although the upper portion 3B of the movable housing 3 includes the concave portions (passage grooves 38), a portion where the concave portion (passage groove 38) is not formed remains, so that the size (first direction dimension) of the upper portion 3B of the movable housing 3 can be secured.

In particular, in the embodiment, the thickness of the peripheral wall (in particular, the front-rear direction walls 37) can be increased while securing the size of the insertion space 3H formed in the upper portion 3B (fitting portion 3B) of the movable housing 3, so that the strength of the peripheral wall can be improved.

Figure 23:
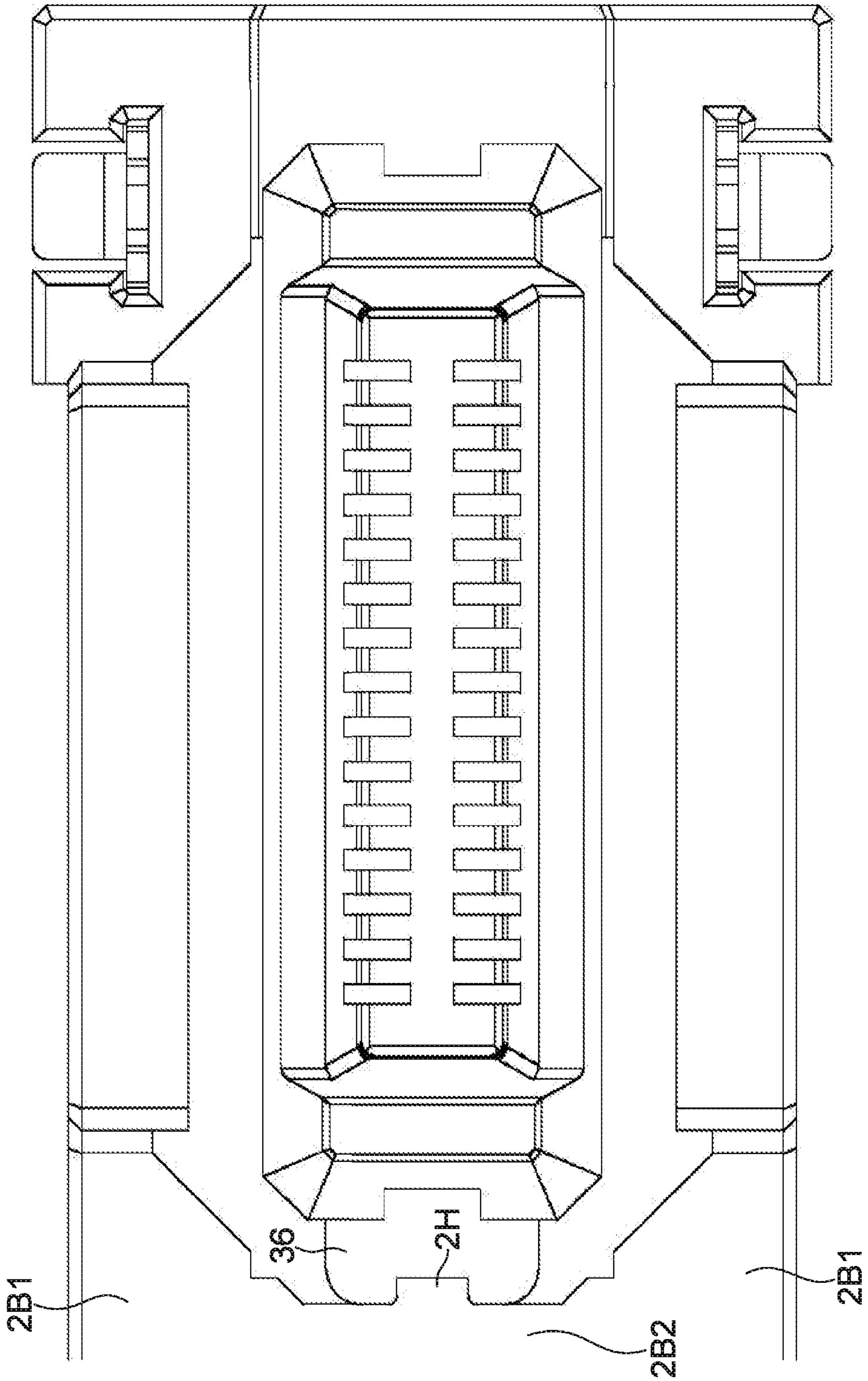
FIG. 23 is a plan view corresponding to FIG. 22.

Further, in the embodiment, when the movable housing 3 moves to the limit in the counter-protruding direction, the protruding portion 36 faces only the convex portion 2H of the entry portion (top wall 2B2, 2C2) in the up-down direction (FIG. 23). Therefore, the movable range of the movable housing 3 in the counter-protruding direction can be increased.

From the viewpoint of increasing the movable range of the movable housing 3 in the counter-protruding direction, when the movable housing 3 moves to the limit in the counter-protruding direction, the protruding portion 36 does not necessarily face only the convex portion 2H of the entry portion (top wall 2B2, 2C2) in the up-down direction. For example, this means that 80% or more of a portion where the protruding portion 36 and the entry portion (top wall 2B2, 2C2) overlap when projected onto a plane orthogonal to the up-down direction is a portion where the protruding portion 36 and the convex portion 2H overlap when projected onto a plane orthogonal to the up-down direction.

However, it is more preferable that 100% of the portion where the protruding portion 36 and the entry portion (top wall 2B2, 2C2) overlap when projected onto a plane orthogonal to the up-down direction is the portion where the protruding portion 36 and the convex portion 2H overlap when projected onto a plane orthogonal to the up-down direction.

Supplementary Explanation

In the above embodiment, an example in which the substrate and the mating substrate are arranged in parallel to each other with the connector pair interposed therebetween in the connection state between the connector 1 and the mating connector (so-called parallel connection) has been described, but the disclosure is not limited thereto. For example, the connection may be a vertical connection or a horizontal connection.

In the above embodiment, the holding of the housing with respect to the terminal is press-fit holding, but may be holding by insert molding.

In the above embodiment, the intermediate portion of the terminal is the intermediate elastic portion, but the intermediate portion of the disclosure is not limited thereto. For example, the terminal may be configured separately by a first portion having a fixing-side held portion and a second portion having a movable-side held portion, and a portion where the first portion and the second portion are in contact with each other may be the "intermediate portion".

In the above embodiment, the connector includes the two movable housings, but the disclosure is not limited thereto. The number of movable housings included in the connector may be one or three or more.

In the above embodiment, the housings are the housings 2 and 3 which are integrally molded entirely with a resin, but the housing of the disclosure is not limited thereto. For example, the housing may be configured by combining resin and metal. Specifically, the upper restriction portion of the fixing housing may be formed of a metal member.

In the above embodiment, the passage grooves 38 as the concave portions are formed in both of the pair of front-rear direction outer surfaces of the movable housing 3, but the disclosure is not limited thereto. For example, the concave portion may be formed only on the front-rear direction outer surface 3A1 on one side of the movable housing 3.

In the above embodiment, the plurality of terminals are held in one movable housing, but the disclosure is not limited thereto. One terminal may be held by one movable housing.

In the above embodiment, the intermediate portion 2B includes the intermediate connection portion (top wall 2B2 of the intermediate portion 2B), but does not necessarily have the intermediate connection portion.

REFERENCE SIGNS LIST

1 connector
2 fixing housing
2A terminal holding portion
2B intermediate portion (restraint space forming portion)
2B1 side wall
2B2 top wall
2C front-rear end portion (restraint space forming portion)
2C1 side wall
2C2 top wall
2C3 reinforcing wall
2H convex portion
21A first terminal holding portion
21C front end portion
21S first arrangement space (first accommodation space)
22A second terminal holding portion
22C rear end portion
22S second arrangement space (second accommodation space)
3 movable housing
31 first movable housing
32 second movable housing
3B upper portion (fitting portion)
3C lower portion
36 protruding portion

36A distal end surface (protruding end surface)
38 passage groove (concave portion)
39 entry concave portion
4 terminal
41 first terminal
42 second terminal
4B fixing-side held portion
4C intermediate elastic portion (intermediate portion)
4D movable-side held portion
6 restraint space
6A1 front restraint space
6A2 rear restraint space
6B intermediate restraint space
7 restriction surface
8 restriction surface
9 entry space

The invention claimed is:

1. A connector comprising:

a fixing housing whose position with respect to an attachment object is fixed;

a first movable housing which is movable with respect to the fixing housing, the first movable housing including a first fitting portion which is fittable with a first connection object;

a second movable housing which is movable with respect to the fixing housing, the second movable housing including a second fitting portion which is fittable with a second connection object;

a first terminal including a first fixing-side held portion held by the fixing housing, a first movable-side held portion held by the first movable housing, and a first intermediate portion located between the first fixing-side held portion and the first movable-side held portion; and a second terminal including a second fixing-side held portion held by the fixing housing, a second movable-side held portion held by the second movable housing, and a second intermediate portion located between the second fixing-side held portion and the second movable-side held portion, wherein the fixing housing includes:

a first terminal holding portion that holds the first fixing-side held portion of the first terminal; and a second terminal holding portion that holds the second fixing-side held portion of the second terminal, wherein at least the first terminal holding portion and the second terminal holding portion of the fixing housing are integrally molded with resin;

wherein the fixing housing includes an intermediate portion connecting the first terminal holding portion and the second terminal holding portion, and wherein a gate mark is formed at the intermediate portion.

2. A connector comprising:

a fixing housing whose position with respect to an attachment object is fixed;

a first movable housing which is movable with respect to the fixing housing, the first movable housing including a first fitting portion which is fittable with a first connection object;

a second movable housing which is movable with respect to the fixing housing, the second movable housing including a second fitting portion which is fittable with a second connection object;

a first terminal including a first fixing-side held portion held by the fixing housing, a first movable-side held portion held by the first movable housing, and a first intermediate portion located between the first fixing-side held portion and the first movable-side held portion; and a second terminal including a second fixing-side held portion held by the fixing housing, a second movable-side held portion held by the second movable housing, and a second intermediate portion located between the second fixing-side held portion and the second movable-side held portion, wherein the fixing housing includes:

a first terminal holding portion that holds the first fixing-side held portion of the first terminal; and a second terminal holding portion that holds the second fixing-side held portion of the second terminal, wherein at least the first terminal holding portion and the second terminal holding portion of the fixing housing are integrally molded with resin;

wherein the fixing housing includes:

an accommodation space that penetrates the fixing housing in an up-down direction and accommodates the first movable housing and the second movable housing; and an intermediate connection portion that divides the accommodation space into a first accommodation space in which the first movable housing is accommodated and a second accommodation space in which the second movable housing is accommodated.

3. The connector according to claim 2, wherein the intermediate connection portion restricts upward movement of the first movable housing by abutting on the first movable housing, and restricts upward movement of the second movable housing by abutting on the second movable housing.

4. A connector comprising:

a fixing housing whose position with respect to an attachment object is fixed;

a first movable housing which is movable with respect to the fixing housing, the first movable housing including a first fitting portion which is fittable with a first connection object;

a second movable housing which is movable with respect to the fixing housing, the second movable housing including a second fitting portion which is fittable with a second connection object;

a first terminal including a first fixing-side held portion held by the fixing housing, a first movable-side held portion held by the first movable housing, and a first intermediate portion located between the first fixing-side held portion and the first movable-side held portion; and a second terminal including a second fixing-side held portion held by the fixing housing, a second movable-side held portion held by the second movable housing, and a second intermediate portion located between the second fixing-side held portion and the second movable-side held portion, wherein the fixing housing includes:

a first terminal holding portion that holds the first fixing-side held portion of the first terminal; and a second terminal holding portion that holds the second fixing-side held portion of the second terminal, wherein at least the first terminal holding portion and the second terminal holding portion of the fixing housing are integrally molded with resin;

wherein the fixing housing includes a first upper restriction portion and a second upper restriction portion, wherein the first movable housing includes a first upper abutment portion that restricts upward movement of the first movable housing by abutting on the first upper restriction portion, wherein the second movable housing includes a second upper abutment portion that restricts upward movement of the second movable housing by abutting on the second upper restriction portion, wherein the first movable housing and the second movable housing are arranged in a predetermined arrangement direction, and wherein the first upper abutment portion and the second upper abutment portion both protrude in the arrangement direction.

5. The connector according to claim 1, wherein the fixing housing includes:

an accommodation space that penetrates the fixing housing in an up-down direction and accommodates the first movable housing and the second movable housing; and an intermediate connection portion that divides the accommodation space into a first accommodation space in which the first movable housing is accommodated and a second accommodation space in which the second movable housing is accommodated, wherein the fixing housing includes a first upper restriction portion and a second upper restriction portion, wherein the first movable housing includes a first upper abutment portion that restricts upward movement of the first movable housing by abutting on the first upper restriction portion, wherein the second movable housing includes a second upper abutment portion that restricts upward movement of the second movable housing by abutting on the second upper restriction portion, wherein the first movable housing and the second movable housing are arranged in a predetermined arrangement direction, wherein the first upper abutment portion and the second upper abutment portion both protrude in the arrangement direction, and wherein the intermediate connection portion functions as the first upper restriction portion and also functions as the second upper restriction portion.

6. The connector according to claim 3, wherein the first movable housing and the second movable housing are arranged in a front-rear direction, wherein the first fixing-side held portion of the first terminal is oriented such that its plate width direction is aligned with the front-rear direction of the connector, and has press-fit protrusions on both sides in the plate width direction, and wherein the first fixing-side held portion of the second terminal is oriented such that its plate width direction is aligned with the front-rear direction of the connector, and has press-fit protrusions on both sides in the plate width direction.

7. The connector according to claim 4, wherein the first movable housing and the second movable housing are arranged in a front-rear direction, wherein the first fixing-side held portion of the first terminal is oriented such that its plate width direction is aligned with the front-rear direction of the connector, and has press-fit protrusions on both sides in the plate width direction, and wherein the first fixing-side held portion of the second terminal is oriented such that its plate width direction is aligned with the front-rear direction of the connector, and has press-fit protrusions on both sides in the plate width direction.

* * * * *